(12) United States Patent
Masuda et al.

(10) Patent No.: US 6,771,414 B2
(45) Date of Patent: Aug. 3, 2004

(54) OPTICAL FIBER AMPLIFIER AND OPTICAL COMMUNICATION SYSTEM USING THE SAME

(75) Inventors: Hiroji Masuda, Mito (JP); Atsushi Mori, Atsugi (JP); Makoto Shimizu, Mito (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 197 days.

(21) Appl. No.: 10/061,772

(22) Filed: Feb. 1, 2002

(65) Prior Publication Data

US 2002/0167717 A1 Nov. 14, 2002

(30) Foreign Application Priority Data

Feb. 2, 2001 (JP) .......................... 2001-027273

(51) Int. Cl.$^7$ .................................. H01S 3/00
(52) U.S. Cl. ................... 359/341.1; 359/334
(58) Field of Search ............. 359/334, 341.1, 359/341.3, 341.5

(56) References Cited

U.S. PATENT DOCUMENTS 5,251,062 A * 10/1993 Snitzer ..................... 359/341

FOREIGN PATENT DOCUMENTS

| EP | 0 858 976 A2 | 8/1998 |
|---|---|---|
| JP | 411204859 A | * 7/1999 |
| JP | 02002311464 A | * 10/2002 |

OTHER PUBLICATIONS

Kidorf et al., *Pump Interactions in a 100-nm Bandwidth Raman Amplifier*, IEEE Photonics Technology Letters, May 1999, pp. 530–532, vol. 11, No. 5, IEEE Inc., New York, US.

Ohishi et al., *Gain Characteristics of tellurite–based erbium–doped fiber amplifiers for 1.5–μm boradband amplification*, Optics Letters, Feb., 1998, vol. 23, No. 4, pp. 274–276, Optical Society of America, Washington, US.

Marhic et al., *Large cross–phase modulation and four wave mixing in tellurite EDFAs*, Nov., 1999, vol. 35, No. 23, pp. 2045–2047, IEE, Stevenage, GB.

Emori et al., *1—THz–Spaced Multi–Wavelength Pumping for Broadband Raman Amplifiers*, Sep. 2000, Proceedings of The European Conference on Optical Communication, XX, XX, pp. 73–74.

C.E. Chryssou, *Gain–equalizing filters for wavelength division multiplexing optical communication systems: a comparison of notch and long–period grating filters for integrated optoelectronics*, Optics Communications, Oct., 2000, pp. 375–384, North–Holland Publishing Co., Amsterdam, NL.

European Search Report for EP 02 35 0699 issued May 15, 2002.

* cited by examiner

*Primary Examiner*—Mark Hellner
(74) *Attorney, Agent, or Firm*—Fitch, Even, Tabin & Flannery

(57) ABSTRACT

This invention relates to the following four structures for attaining a flat gain spectrum over a wide wavelength region. The first structure relates to a Raman amplifier where a tellurite fiber is pumped with two wavelengths having a predetermined difference. The second structure relates to a Raman amplifier or an optical communication system employing a tellurite fiber and a silica fiber. The third structure relates to an optical fiber amplifier employing an Erbium-doped tellurite fiber of which Erbium concentration is low. The fourth structure relates to an optical fiber amplifier employing a rare-earth doped fiber such as the Erbium-doped fiber and a tellurite fiber.

107 Claims, 23 Drawing Sheets

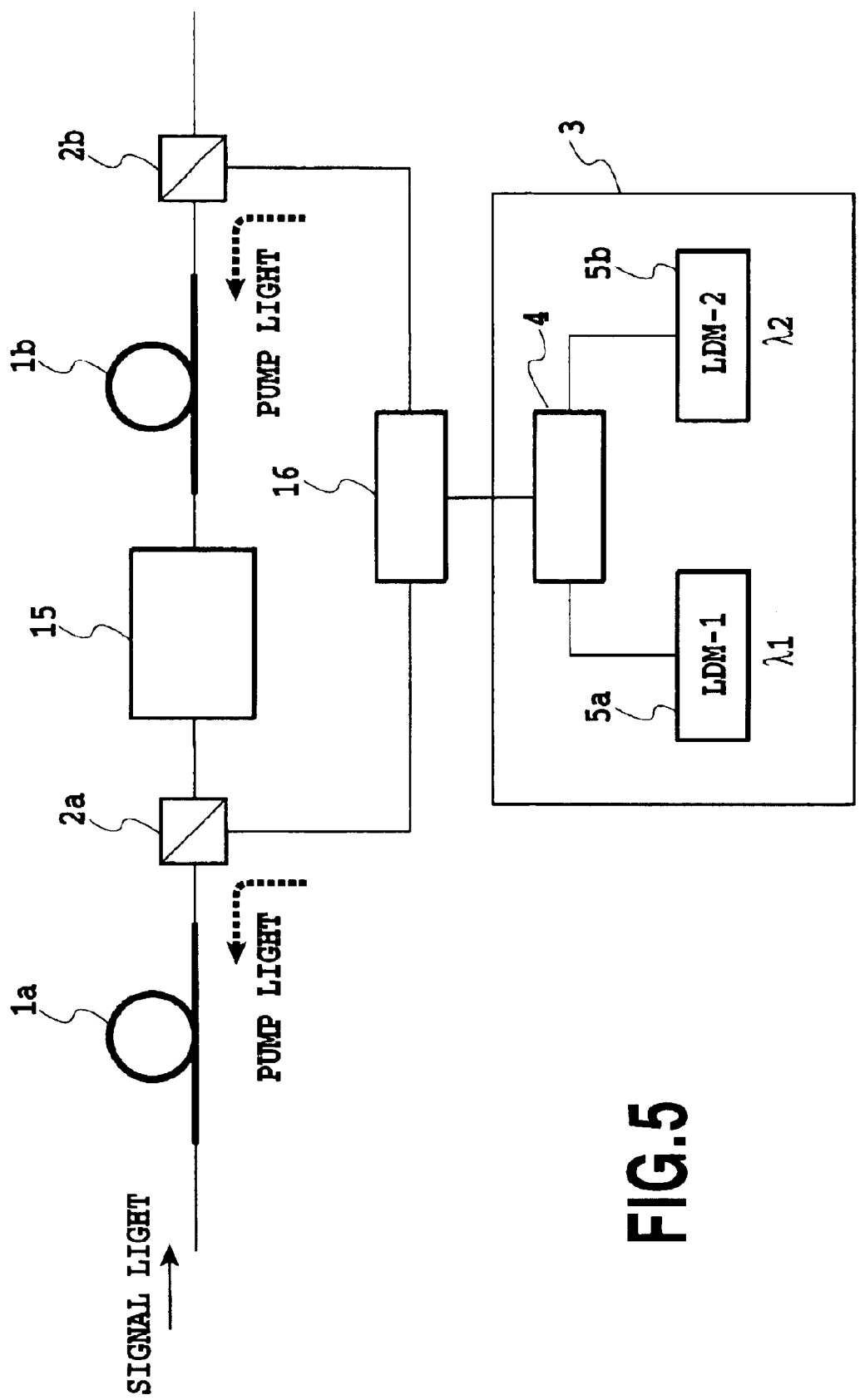

OPTICAL FIBER AMPLIFIER AND OPTICAL COMMUNICATION SYSTEM USING THE SAME

This application is based on Japanese Patent Application No. 2001-27273 filed on Feb. 2, 2001, the content of which is incorporated herein by reference.

BACKGROUND OF THE INVENTION

1. Field of the Invention

This invention relates to an optical fiber amplifier and an optical communication system using the optical fiber amplifier.

2. Description of the Related Art

It has become increasingly important year after year to increase the capacity of the optical communication system. One of the promising approaches to higher communications capacities is the fiber-optic wavelength division multiplexing system (WDM system). In order to increase the capacity of the WDM system and the number of available channels, an amplifier presenting flat gain characteristics over a wider range of wavelength will be needed; for example, a bandwidth wider than 100 nm is predicted to become necessary in the future.

As conventional amplifiers for the fiber-optic communication system, rare-earth element doped amplifiers such as the Erbium-doped fiber amplifier(EDFA), Thulium-doped fiber amplifier(TDFA) and Praseodymium-doped fiber amplifier(PDFA) have been used. However, the band for signal amplification is dependent on the doped element and this band cannot be changed as desired, in such rare-earth doped fiber amplifiers. In addition, the wavelength range of flat gain is currently limited to 40 nm at the maximum in such rare-earth doped fiber amplifiers. Also, it is not allowed to amplify signals in the 1510–1530 nm range or the range of 1460 nm or less. Three or four rare-earth doped fiber amplifiers for different wavelengths must be jointly used to provide a bandwidth of about 100–200 nm of flat gain characteristics. Then the system will be complex and its manufacturing cost will become high.

Meanwhile, Raman fiber amplifiers have been intensively investigated in recent years, which can amplify light signals in the ranges where the rare-earth doped fiber amplifiers cannot work, and whose amplification range can be set in any desired wavelengths. FIG. 1A illustrates the structure of the prior art Raman amplifier using the silica fiber (hereafter, silica Raman amplifier). The Raman amplifier of this type is described by H. Masuda et al. in Tech. Dig. of ECOC, pp. 139–140, 1998. This amplifier intensifies the input signals that have gone through wavelength division multiplexing. This Raman amplifier has an optical fiber 51 serving as a gain medium, a pump light source 53 for pumping the medium and a coupler 52 for combining the pump light emitted from the pump light source and the signal light. This optical fiber is usually a silica fiber having a large NA(numerical aperture). Note that, for simplicity of description, FIG. 1A does not show common optical parts such as isolators installed before and after the optical fiber.

The amplifier shown in FIG. 1A has the configuration that is most commonly employed where the pump light and the signal light travel in opposite directions, namely, the backward pumping configuration. The following description, however, may apply to the forward pumping configuration as well. The pump light emitted from the pump light source may have a one or more wavelength. FIG. 1B illustrates the gain coefficient spectrum of a silica Raman amplifier using pump light of a single wavelength. The horizontal axis represents the difference in wavelength between the signal light and the pump light. The gain coefficient spectrum of this silica Raman amplifier using pump light of a single wavelength shows a single peak at around 100 nm. The flat gain bandwidth is about 20 nm at most in this silica Raman amplifier using pump light of a single wavelength.

Y. Emori et al. presented a silica Raman amplifier in Proc. of OFC, PD19 in 1999, that was capable for providing a flat gain bandwidth of up to 100 nm by a gain spectrum flattening and bandwidth widening technique using pump light of 10 and some wavelengths. The range of the flat gain bandwidth was determined by the physical properties of the silica fiber. This silica Raman amplifier was very expensive because it needed more than 10 light sources of different wavelengths and an optical circuit for combining the pump light beams emitted from those light sources.

The continuous flat gain bandwidth provided by low-cost amplifiers has been typically limited to about 60 nm in the prior art.

Thus there has been a long-lasting demand for an amplifier capable of providing a wider band (60 nm or more) and flatter gain characteristics than the conventional one, in order to increase the capacity and available channel number of the WDM system.

SUMMARY OF THE INVENTION

It is, therefore, the object of the present invention to provide an optical fiber amplifier and an optical communication system using the amplifier for yielding a wideband and flat gain spectrum by combining more than one gain spectrum.

The inventors have found that the gain coefficient spectrum of the Raman amplifier using tellurite-glass as the gain medium (hereafter, tellurite Raman amplifier) lies in longer wavelengths than those for the silica Raman amplifier if the pump wavelength is the same. FIG. 2 shows the gain coefficient spectrum of the tellurite-Raman amplifier using pump light of a single wavelength. The horizontal axis represents the difference in wavelength between the single light and the pump light. As evident from FIG. 2, the tellurite-Raman amplifier has two peaks in its gain coefficient spectrum at around 170 nm and 90 nm in wavelength difference (hereafter, referred to as the first peak P1 and the second peak P2, respectively), while presenting a valley at around 120 nm in wavelength difference (hereafter, the first bottom B1). The gain coefficient falls at wavelengths shorter than the wavelength of the second peak (hereafter, this region is referred to as the second bottom B2).

Since the tellurite Raman amplifier has a Stokes shift larger than that of the silica Raman amplifier and the distance between the first peak P1 and the second peak P2 is long, it has the potential to be a wideband amplifier applicable to wider ranges of wavelength. In order to make the tellurite Raman amplifier available in the WDM system, the gain coefficient spectrum must be flattened by raising the gain coefficient in the first bottom B1 located between the first peak P1 and the second peak P2. Further, if the gain coefficient in the second bottom B2 is also raised, the tellurite Raman amplifier can be used as an amplifier for the WDM system that will utilize a wider bandwidth in the future.

Besides, since the gain coefficient of the tellurite Raman amplifier is higher than that of the silica Raman amplifier, the same level of gain coefficient is provided by a shorter tellurite-glass fiber. For these reasons, the tellurite Raman amplifier is advantageous for use in the WDM system.

The first aspect of the present invention is a Raman amplifier having a tellurite fiber pumped with at least two pump light beams of different wavelengths, wherein the difference in wavelength is predetermined. This Raman amplifier may have two or more tellurite fibers to present a multi-stage structure (the first and second embodiments).

The second aspect of the present invention is a Raman amplifier having a tellurite fiber pumped with pump light of a single wavelength and a silica fiber pumped with another pump light of a single wavelength, wherein the wavelengths of pump light are different from each other (the third to fifth embodiments).

The third aspect of the present invention is a Raman amplifier having a plurality of tellurite and silica fibers alternately located, wherein those fibers are pumped with at least two pump light beams of different wavelengths (the sixth embodiment).

The fourth aspect of the present invention is a Raman amplifier having a tellurite fiber pumped with pump light of a single wavelength and a silica fiber pumped with two or more pump light beams of wavelengths different from each other (the seventh embodiment).

The fifth aspect of the present invention is a Raman amplifier having a tellurite fiber pumped with two or more pump light beams of wavelengths different from each other and a silica fiber pumped with pump light of a single wavelength (the eighth embodiment).

The sixth aspect of the present invention is a Raman amplifier having a tellurite fiber pumped with two or more pump light beams of wavelengths different from each other and a silica fiber pumped with two or more pump light beams of wavelengths different from each other. This Raman amplifier may have an additional tellurite fiber pumped with two or more pump light beams of wavelengths different from each other (the ninth and tenth embodiments).

The seventh aspect of the present invention is a Raman amplifier having a rare-earth doped fiber and a tellurite fiber, wherein those fibers are pumped with pump light beams of wavelengths different from each other (the eleventh to fourteenth embodiments).

The eighth aspect of the present invention is a Raman amplifier having a tellurite fiber to which a low concentration of erbium has been doped, wherein this fiber is pumped with two pump light beams (the fifteenth and sixteenth embodiments).

The ninth aspect of the present invention is an optical communication system having a tellurite fiber and a silica fiber serving as a transmission line, wherein those fibers are pumped with pump light beams of wavelengths different from each other (the seventeenth embodiment).

The tenth aspect of the present invention is an optical communication system having: a tellurite fiber pumped with light of a single wavelength or pumped with two or more pump light beams of wavelengths different from each other; a first silica fiber pumped with light of a single wavelength or pumped with two or more pump light beams of wavelengths different from each other; and a second silica fiber that serves as a transmission line and is pumped with light of a single wavelength or pumped with two or more pump light beams of wavelengths different from each other (the eighteenth embodiment).

The optical fiber amplifier according to the present invention is a Raman fiber amplifier using a tellurite fiber in principle and provides such advantages as the widening of flat gain wavelength region, reduction of noise figure and augmented output of the amplifier, through the combination of techniques: 1) pumping the tellurite fiber with two wavelengths; 2) pumping the tellurite fiber and the silica fiber with different wavelengths; 3) pumping the low-concentration Er-doped tellurite fiber with one or two wavelengths; and 4) pumping the tellurite fiber and the Tm-doped fiber with different wavelengths. The approach of the present invention can reduce the manufacturing cost of the amplifier because the above goals are attained with a minimal number of pumping light sources.

Also the optical communication system according to the present invention is a system that uses a repeater incorporating the tellurite fiber and the silica fiber transmission line for distributive amplification. Through the combination of the above techniques, the range of flat gain bandwidth is expanded, noise figure is reduced, and the output of the amplifier is augmented even with a minimal number of pump light sources.

The above and other objects, effects, features and advantages of the present invention will become more apparent from the following description of the embodiments thereof taken in conjunction with the accompanying drawings.

BRIEF DESCRIPTION OF THE DRAWING

FIG. 5 is a diagram illustrating the structure of the Raman amplifier according to the second embodiment of the invention;

DETAILED DESCRIPTION OF PREFERRED EMBODIMENTS

This invention relates to a Raman amplifier using the tellurite fiber and an optical communication system using this amplifier, more specifically, to a Raman amplifier for amplifying the signal light of the 1.3–1.5 $\mu$m band which is the wavelength region of low propagation loss for optical fibers and the optical communication system using this amplifier. In general, the Raman amplifier can enhance the signal intensity in any desired range of wavelength by properly selecting a wavelength for pumping.

In this specification, "connecting in series" two members means that signal light propagates between the two members with experiencing no splitting. This expression indicates that there may exist common optical parts (such as a coupler for introducing pump light) between the two members.

The First Embodiment

Figure 3:
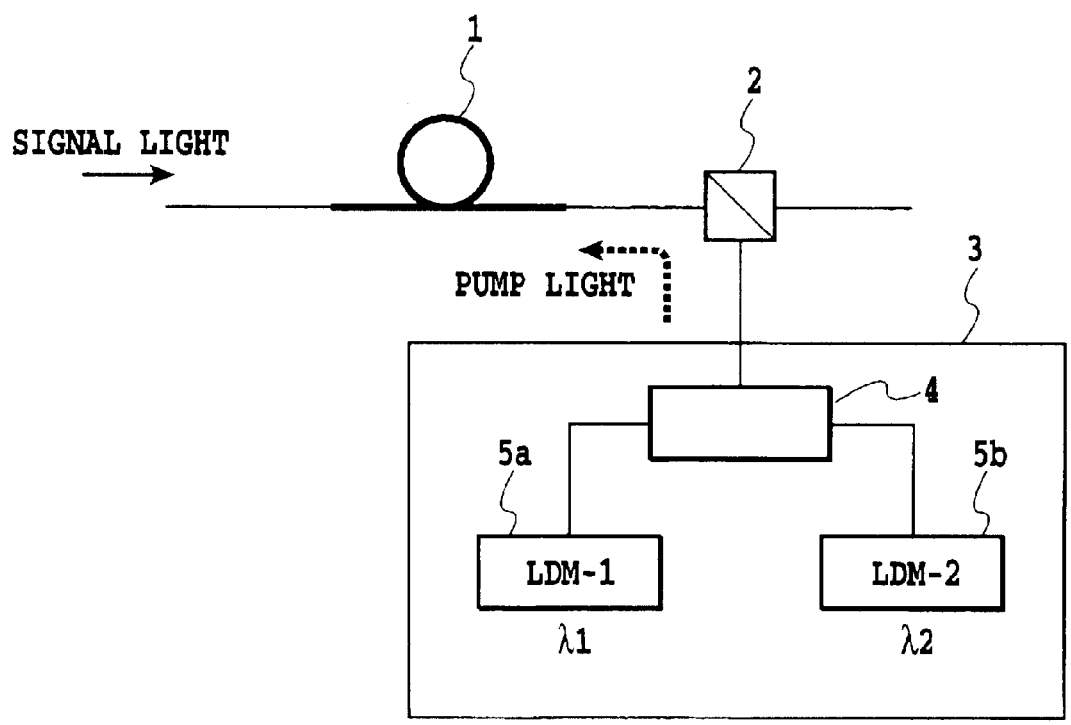
FIG. 3 is a diagram illustrating the structure of the Raman amplifier according to the first embodiment of the invention.

The first embodiment of the present invention is a tellurite Raman amplifier shown in FIG. 3 that has a tellurite fiber and two laser sources for pump light of different wavelengths. The difference in wavenumber between the two pump light beams emitted from the respective laser sources is 125–290 $cm^{-1}$ in absolute values.

Referring now to FIG. 3, the optical fiber serving as a gain medium is a tellurite fiber 1. The two pump light beams emitted from the laser sources 5a and 5b are coupled in the coupler 4 and then enter the tellurite fiber 1 via the coupler 2 opposite in direction to the travel of signal light.

The available tellurite fibers have compositions of $TeO_2$—$ZnO$—$M_2O$—$L_2O_3$ or $TeO_2$—$ZnO$—$M_2O$—$L_2O_3$—$QO_2$. In these compositions, "M" represents one or more alkaline metals; "L" at least one of B, Bi, La, Al, Ce, Yb and Lu; and "Q" at least one of Ge, Si and Ti. The tellurite fiber may be a dispersion compensating fiber.

The laser sources 5a and 5b may be semiconductor laser modules(LDM) or Raman laser. Particularly, LDM is suitable for practical use because it is compact, reliable and long-life. Thus the embodiments of the present invention employ LDM as the laser source. However, it is evident that laser modules other than LDM will provide the same effects. In this specification, two LDMs 5a and 5b are denoted as LDM-1 and LDM-2, while their pump light wavelengths are denoted $\lambda 1$ and $\lambda 2$ respectively.

In FIG. 3, the pump light of more than one wavelength precombined the pump light beams emitted from two pump light sources LDM-1 and LDM-2 is introduced into the tellurite fiber 1 via the coupler 2. However, the pump light beams emitted from LDM-1 and LDM-2 may be separately injected into the tellurite fiber without precombination.

FIG. 3 shows a configuration where the pump light travels in opposite to the direction of signal light, namely, in the backward pumping configuration; however, it may take the forward pumping configuration where the signal light and the pump light travel in the same direction.

Alternatively, a gain equalizer may be installed downstream of the tellurite fiber 1 or the coupler 2 in FIG. 3, to further flatten the gain coefficient spectrum.

In order to extend the flat gain region of the Raman amplifier according to the present invention, $\lambda 1$ and $\lambda 2$ should be set at wavelengths so that the first bottom in the gain coefficient spectrum provided by the pump light of wavelength $\lambda 1$ is compensated by the first peak in the gain coefficient spectrum provided by the pump light of wavelength $\lambda 2$. As indicated by the gain coefficient spectrum shown in FIG. 2, the flat gain region can be extended when the difference between $\lambda 1$ and $\lambda 2$ is 30–70 nm. The difference between $\lambda 1$ and $\lambda 2$ is preferably 35–60 nm, more preferably 40–50 nm.

The Raman amplifier can operate at any desired wavelength range corresponding to the wavelength of pump light. The gain band is expressed more precisely by energy or wavenumber($cm^{-1}$, kayser) than by wavelength. For example, a difference of 30–50 nm in wavelength in the above 1.55 $\mu$m band is equal to a difference about 125–290 $cm^{-1}$ in wavenumber. This difference in wavenumber is maintained in any wavelength band. Note that a difference of 125 $cm^{-1}$ in wavenumber corresponds to a difference of 30 nm in wavelength in the 1.55 $\mu$m band, while it corresponds to a difference of 24.5 nm, 0.86 times the above value, in the 1.4 $\mu$m band.

Instead of two laser sources, three or more laser sources may be used that emit pump light beams of different wavelengths. Namely, three or more laser sources may also be used as far as their wavelength settings are the same as the above. More specifically, the three or more laser sources are divided into two wavelength groups of which wavelength ranges do not overlap, and the absolute value of the difference in wavenumber between their corresponding weight center wavelengths of the two wavelenght groups is at 125–290 $cm^{-1}$.

The weight center wavelength $\lambda c$ is defined as follows assuming that the light powers of as many as n wavelengths ($\lambda 1$–$\lambda n$) are given by P1–Pn.

$$\lambda c = \sum_{t=1}^{n} \lambda t P t \bigg/ \sum_{t=1}^{n} P t$$

If described on a quantitative basis, assuming that the first wavelength group is made of $\lambda 11-\lambda 1n$ and the second wavelength group of $\lambda 21-\lambda 2m (\lambda 1-\lambda 1n > \lambda 21-\lambda 2m)$ and that the weight center wavelength of the first wavelength group is $\lambda 1c$ and that of the second wavelength group $\lambda 2c$, the difference between $\lambda 1c$ and $\lambda 2c$ is adjusted in 30–70 nm. Therefore, the absolute difference in wavenumber between light beams corresponding to center wavelengths $\lambda 1c$ and $\lambda 2c$ of the two groups is 125–290 cm$^{-1}$.

For example, a four-wavelength setting may be employed where the individual set of wavelength and power are 1460 nm, 200 mW; 1450 nm, 50 mW; 1410 nm, 200 mW; and 1400 nm, 50 mW. In this case, the weight center wavelength of the two pump light beams of 1460 nm, 200 mW and 1450 nm, 50 mW, is 1458 nm; while that of another two beams, 1410 nm, 200 mW and 1400 nm, 50 mW, is 1408 nm. Since the difference in weight center wavelength is 50 nm, this four-wavelength setting works equally with the above two-wavelength pumping setting.

In order to extend the flat gain band based on the above wavelength settings for pump light, it is necessary to control the magnitude of the gain coefficient provided by each pump light. Such control of the gain coefficient is performed by setting the output power of light sources LDM-1 and LDM-2 at appropriate levels.

EXAMPLE 1

In the Raman amplifier shown in FIG. 3, the wavelength of pump light emitted from LDM-1 was set at 1460 nm and its power at 500 mW; while that of pump light emitted from LDM-2 at 1410 nm and its power at 500 mW. The length of the tellurite fiber 1 was 200 m.

Figure 4A:
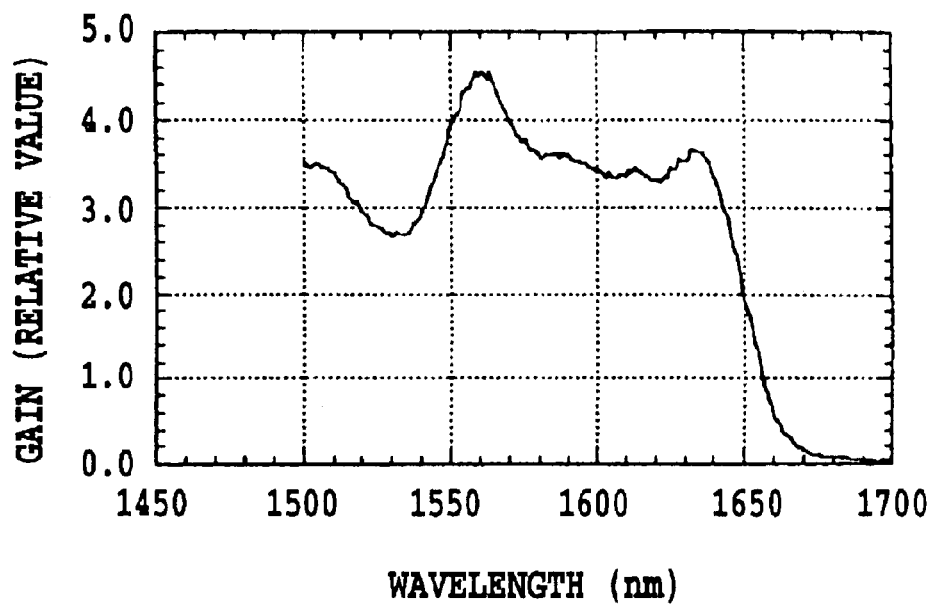
FIG. 4 illustrates the gain coefficient spectra of the tellurite Raman amplifier according to the first embodiment of the invention, FIG. 4A showing the gain spectrum (relative value in dB values) obtained in Example 1, and FIG. 4B showing the gain spectrum (relative value in dB values) obtained in Example 2.

FIG. 4A demonstrates the gain spectrum (relative value in dB values) provided by the present example. The present example provided a gain spectrum flattened over the about 150 nm range (flat gain band) between around 1500–1650 nm. This flat gain band was considerably wider than the about 60 nm range provided by prior art.

The tellurite fiber used in the present embodiment was much shorter than the silica fiber used in the prior art silica Raman amplifier. However, it had gain coefficients equal to or higher than those of the silica fiber.

EXAMPLE 2

Example 1 was repeated except that the wavelength of pump light emitted from LDM-2 was set at 1420 nm.

Figure 4B:
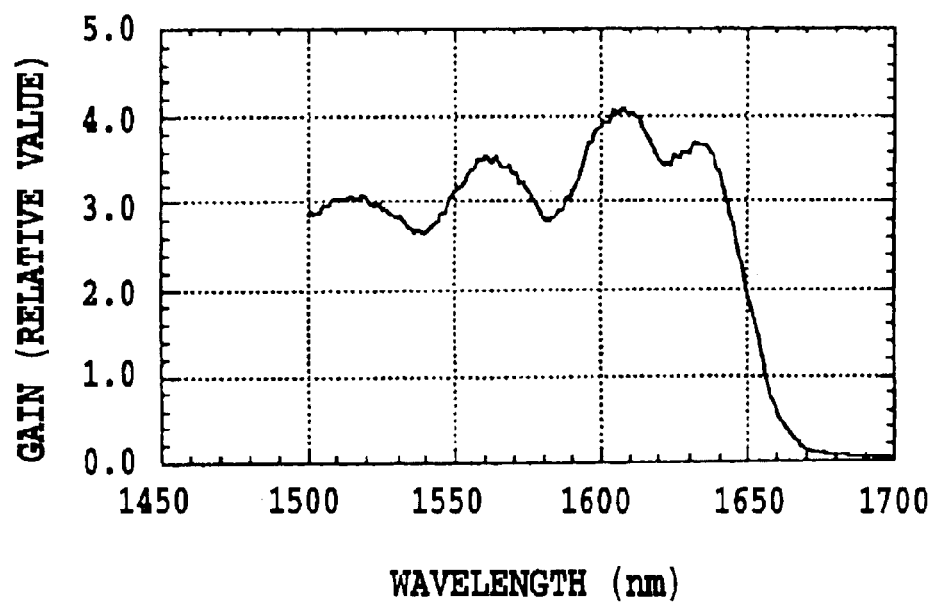

FIG. 4B demonstrates the gain spectrum (relative value in dB values) provided by the present example. The present example provided a gain spectrum flattened over the about 150 nm range (flat gain band) between around 1500–1650 nm. This flat gain band was considerably wider than the about 60 nm range provided by prior art.

The Second Embodiment

The second embodiment of the present invention is a tellurite Raman amplifier shown in FIG. 5 that has two tellurite fibers, a gain equalizer installed between these tellurite fibers, and two laser sources for pump light of different wavelengths ($\lambda 1$ and $\lambda 2$).

In the configuration shown in FIG. 5, a tellurite fiber 1a, a coupler 2a, a gain equalizer 15, a tellurite fiber 1b, and a coupler 2b are connected in series. The pump light beams emitted from laser sources 5a and 5b are combined in the coupler 4. The combined pump light is divided by a splitter 16; one output beam from the splitter is guided to the coupler 2a to pump the tellurite fiber 1a and the other to the coupler 2b to pump the tellurite fiber 1b.

The tellurite fiber employed in this embodiment is the same as that used in the first embodiment.

Pump light is supplied to both of the two tellurite fibers. In this case, separate pump light sources may be prepared for the individual tellurite fibers. However, it is better to use a single light source like 3 that shown in FIG. 5, for simplicity of configuration and low cost for the Raman amplifier. Although FIG. 5 shows the backward pumping configuration, the forward pumping configuration is allowed as well in the present embodiment.

The requirements that wavelengths $\lambda 1$ and $\lambda 2$ should meet for bandwidth widening of the flat gain band of the Raman amplifier are the same as those described in the first embodiment. Namely, when the difference between $\lambda 1$ and $\lambda 2$ is set at a value between 30 nm and 70 nm, the flat gain band can be extended. In particular, $\lambda 1-\lambda 2=50$ nm is preferred. In the wavelength band for amplifying the signals of the 1.55 $\mu$m band, the difference in wavenumber between the two pump light beams corresponding to the aforementioned wavelength difference, 30–50 nm, becomes about 125–290 cm$^{-1}$.

Alternatively, pump light beams emitted from three or more laser sources may be used, as is the case with the first embodiment. In such a case, the three or more laser pump beams are divided into two wavelength groups of which wavelength ranges do not overlap, and the absolute value of the difference in wavenumber between the corresponding weight center wavelengths of the two wavelength groups is set at 125–290 cm$^{-1}$.

A gain equalizer 15 is installed between the tellurite fibers 1a and 1b so that the output power of the Raman amplifier is held high. Because signal light is amplified by the tellurite fiber 1b located in the downstream stage after it has been attenuated to a predetermined extent in the gain equalizer 15, the output power of the Raman amplifier is determined by the output power of the tellurite fiber 1b located in the downstream stage and kept at a high level. Meanwhile, if the gain equalizer 15 is installed in the final stage, namely, downstream of the tellurite fiber 1b, the obtained output power will be lower than the output power of the tellurite fiber 1b by the loss in the gain equalizer 15.

The spectral characteristics of the transmission loss of the gain equalizer are determined taking account of the gain spectrum shown in FIG. 4. For example, a simple equalization can be easily conducted on the gain spectrum shown in FIG. 4A in the about 1500–1650 nm wavelength region with a gain equalizer having a transmission loss spectrum having a Gaussian profile of which peak wavelength lies at about 1560 nm and half width at half depth (hereinafter, referred to as half-width) is about 20 nm.

EXAMPLE 3

In the Raman amplifier shown in FIG. 5, the wavelength of pump light emitted from LDM-1 was set at 1460 nm and its power at 500 mW; while that of pump light emitted from LDM-2 at 1410 nm and its power at 500 mW. The tellurite fibers 1a and 1b were 200 m and 180 m long, respectively. A gain equalizer was used that had a transmission loss spectrum having a Gaussian profile of which peak wavelength lay at about 1560 nm, peak loss was 8 dB and half-width was about 20 nm.

The Raman amplifier of this example provided a flat gain spectrum over the about 1500–1650 nm wavelength region. The flatness in the gain spectrum raised by 8 dB, compared with the case using no gain equalizer.

The Third Embodiment

Figure 6:
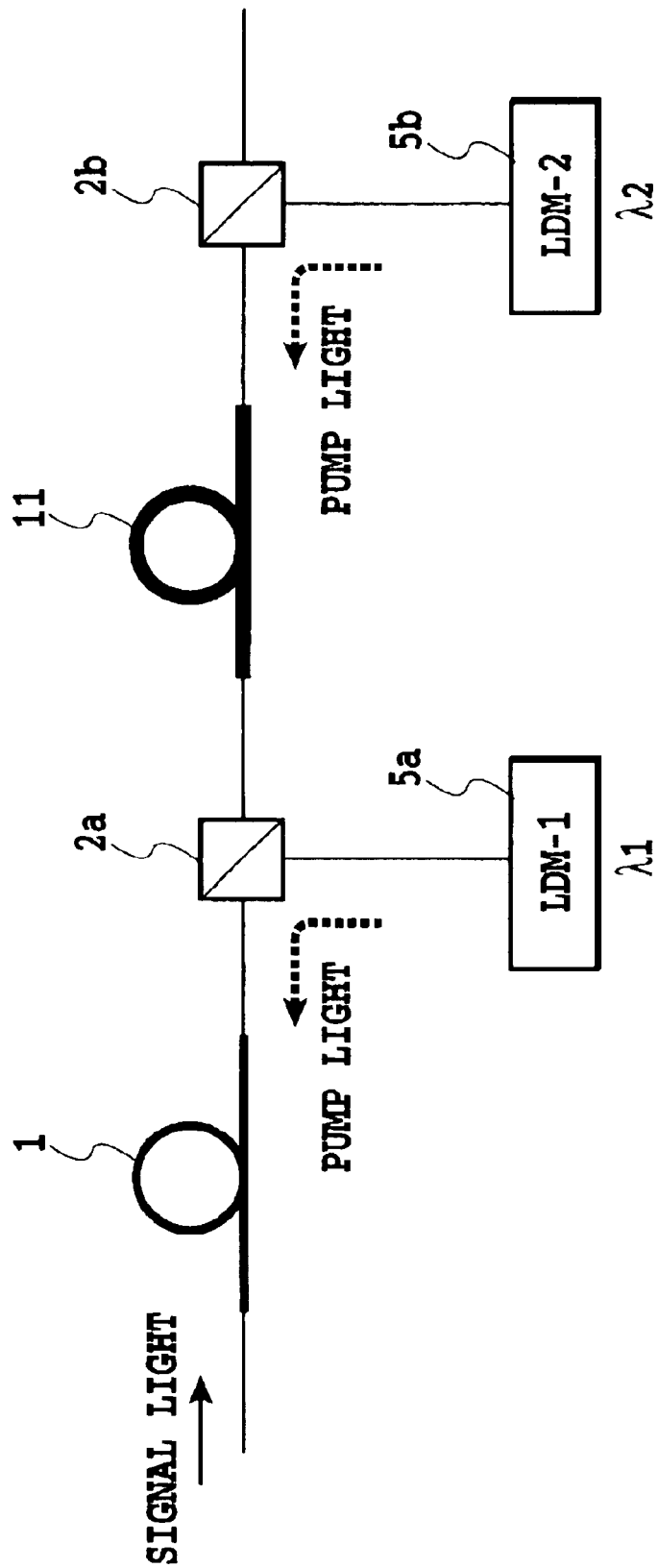
FIG. 6 is a diagram illustrating the structure of the Raman amplifier according to the third embodiment of the invention.

The third embodiment of the present invention is a tellurite Raman amplifier shown in FIG. 6 that has a tellurite fiber, a silica fiber, two laser sources for pump light of different wavelengths and two couplers that combine the pump light emitted from these laser sources and signal light.

Referring now to FIG. 6, the tellurite fiber 1, coupler 2a, silica fiber 11 and coupler 2b are connected in series. The pump light($\lambda 1$) emitted from the first laser source 5a pumps the tellurite fiber 1 when introduced via the coupler 2a, while the pump light($\lambda 2$) emitted from the second laser source 5b pumps the silica fiber 11 when introduced via the coupler 2b.

In this embodiment, the first bottom B1 of the gain coefficient spectrum of the tellurite fiber provided by the pump light($\lambda 1$) emitted from the first laser source is compensated by overlapping it on the peak of the gain coefficient spectrum of the silica fiber provided by the pump light($\lambda 2$). This compensation is attained by setting the difference between $\lambda 1$ and $\lambda 2$ at $\lambda 2 - \lambda 1 = 25 \pm 15$ nm, namely, 10 nm$<\lambda 2 - \lambda 1 <$40 nm. The difference between $\lambda 1$ and $\lambda 2$ is more preferably 15 nm–35 nm, and most preferably 20–30 nm. In the wavelength range of pump light used for amplifying the signals of the 1.55 $\mu$m band, such a difference in wavelength of 10 nm–40 nm, corresponds to the difference in wavenumber of about 42–166 cm$^{-1}$.

Since the best parameter settings for the silica fiber 11 are similar to those for the dispersion compensating fiber(DCF) used in high-speed (for example, 10 Gbit/s) optical communication systems, DCF can be employed as the silica fiber 11 in the present embodiment. DCF is a fiber that has the opposite dispersion of the fiber being used in a transmission system and compensate the distortion of light pulses caused by the dispersion of refractivity dependent on wavelength. Typical DCF for use in transmission lines using the 1.3 $\mu$m zero-dispersion fiber and the typical silica fiber for use in the Raman amplifier have almost the same compositions and numerical apertures. Since the typical tellurite fiber presents a negative dispersion in the 1.5 $\mu$m band, it can be employed as DCF as is the case with the silica fiber.

It is preferable in this embodiment to place the tellurite fiber 1 in the upstream stage of the signal light, because this configuration provides lower noise figure. This is explained by that the Raman gain band of the silica fiber is narrower than that of the tellurite fiber. For example, when $\lambda 1 = 1450$ nm, the Raman gain of the tellurite fiber have an appropriate value in the 1460–1620 nm range. In this case, the wavelength of the pump light for the silica fiber, $\lambda 2$, is required to be set at around 1475 nm. Meanwhile, the region where the Raman gain can be obtained by the silica fiber is limited to wavelengths of $\lambda 2 + 130$ nm or shorter (that is, 1605 nm or shorter). If the silica fiber is located in an upstream stage, the noise figure degrades (i.e. noise increases) in the longer than $\lambda 2 + 130$ nm wavelength region (longer than 1605 nm) because of a power loss in the silica fiber. Thus the tellurite fiber should be located in the upstream stage.

In order to extend the flat gain band based on the above wavelength settings for pump light, it is necessary to control the magnitude of the gain coefficient provided by each pump light. The gain coefficient can be controlled by properly setting the output powers of light sources LDM-1 and LDM-2 and the lengths of the silica fiber and tellurite fiber.

EXAMPLE 4

In the Raman amplifier shown in FIG. 6, the wavelength of the first pump light emitted from LDM-1 was set at 1450 nm and its power at 300 mW. The wavelength of the second pump light emitted from LDM-2 was set at 1475 nm and its power at 300 mW. The tellurite fiber 1 and the silica fiber 11 were 200 m and 5 km long, respectively.

The Raman amplifier of this example provided a flat gain spectrum (flat gain bandwidth of 80 nm) over the about 1550–1630 nm wavelength region.

The Fourth Embodiment

Figure 7:
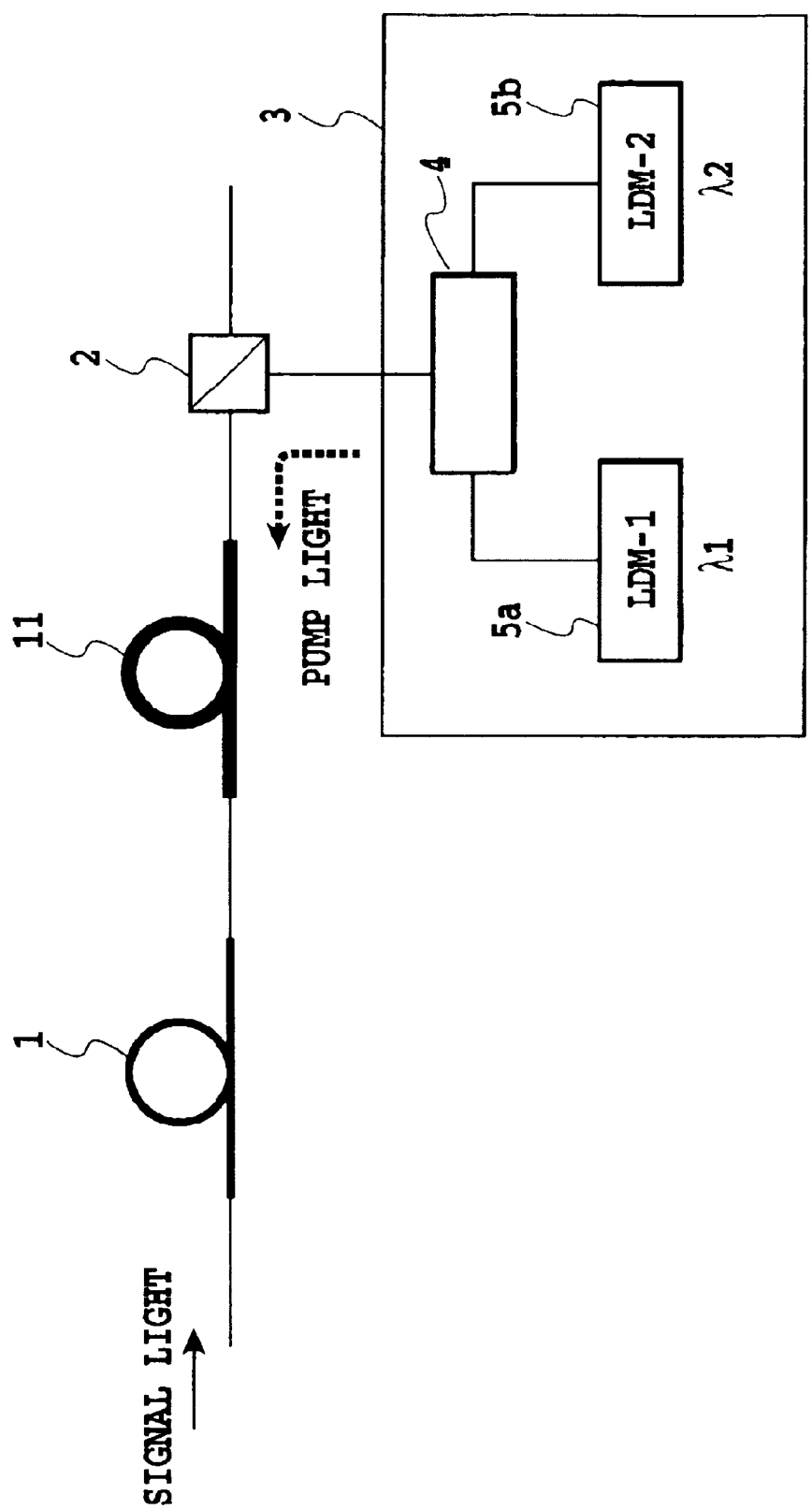
FIG. 7 is a diagram illustrating the structure of the Raman amplifier according to the fourth embodiment of the invention.

The fourth embodiment of the present invention is a tellurite Raman amplifier shown in FIG. 7 that has a tellurite fiber, a silica fiber, first and second laser sources for pump light of different wavelengths and a coupler that combines the pump light beams emitted from the first and second laser sources.

Referring now to FIG. 7, a tellurite fiber 1, silica fiber 11 and coupler 2 are connected in series. The pump light($\lambda 1$) emitted from the first laser source 5a and the pump light($\lambda 2$) emitted from the second laser source 5b are combined in the coupler 4 and then sent to the silica fiber 11 and tellurite fiber 1 in this order via the coupler 2. The signal light is introduced from the side of the tellurite fiber (namely, the tellurite fiber is located in the upstream stage of the signal light).

These tellurite fiber and the silica fiber are the same as those employed in the third embodiment.

Two pump light beams of different wavelengths emitted from the first and second laser sources 5a and 5b first pump the silica fiber 11 and then the light that was not used in the pumping of the silica fiber goes out of the silica fiber 11. Subsequently, the two pump light beams coming out of the silica fiber pump the tellurite fiber In this embodiment, the first bottom of the gain coefficient spectrum of the tellurite fiber provided by the pump light($\lambda 1$) emitted from the first laser source is compensated by overlapping it on the peak of the gain coefficient spectrum of the silica fiber provided by the pump light($\lambda 2$). This compensation is attained by setting the difference between $\lambda 1$ and $\lambda 2$ at $\lambda 2 - \lambda 1 = 25 \pm 15$ nm, namely, 10 nm$<\lambda 2 - \lambda 1 <$40 nm. The difference between $\lambda 1$ and $\lambda 2$ is more preferably 15 nm–35 nm, and most preferably 20–30 nm. In the wavelength region of pump light used for amplifying the signals of the 1.55 $\mu$m band, the difference in wavenumber corresponding to such a difference in wavelength, 10 nm–40 nm, is about 42–166 cm$^{-1}$.

It is noted that the gain coefficient spectrum of the whole Raman amplifier according to this embodiment is slightly different from that of the Raman amplifier according to the third embodiment using the pump light beams of the same wavelengths $\lambda 1$ and $\lambda 2$, because it includes the gain coefficient spectrum of the silica fiber pumped with the light of wavelength $\lambda 1$ and that of the tellurite fiber pumped with the pump light of wavelength $\lambda 1$ attenuated in the silica fiber and with the pump light of wavelength $\lambda 2$.

In the Raman amplifier according to this embodiment, it is preferable that the tellurite fiber 1 is located in the upstream stage of the signal light. However, the silica fiber 11 may be located in the upstream stage, exchanging the locations of the silica fiber 11 and the tellurite fiber 1.

EXAMPLE 5

In the Raman amplifier shown in FIG. 7, the wavelength of the first pump light emitted from LDM-1 was set at 1450 nm and its power at 300 mW. The wavelength of the second pump light emitted from LDM-2 was set at 1475 nm and its power at 300 mW. The tellurite fiber 1 and the silica fiber 11 were 200 m and 5 km long, respectively.

The Raman amplifier of this example provided a flat gain spectrum (flat gain bandwidth of 80 nm) over the about 1550–1630 nm wavelength region.

The Fifth Embodiment

Figure 8:
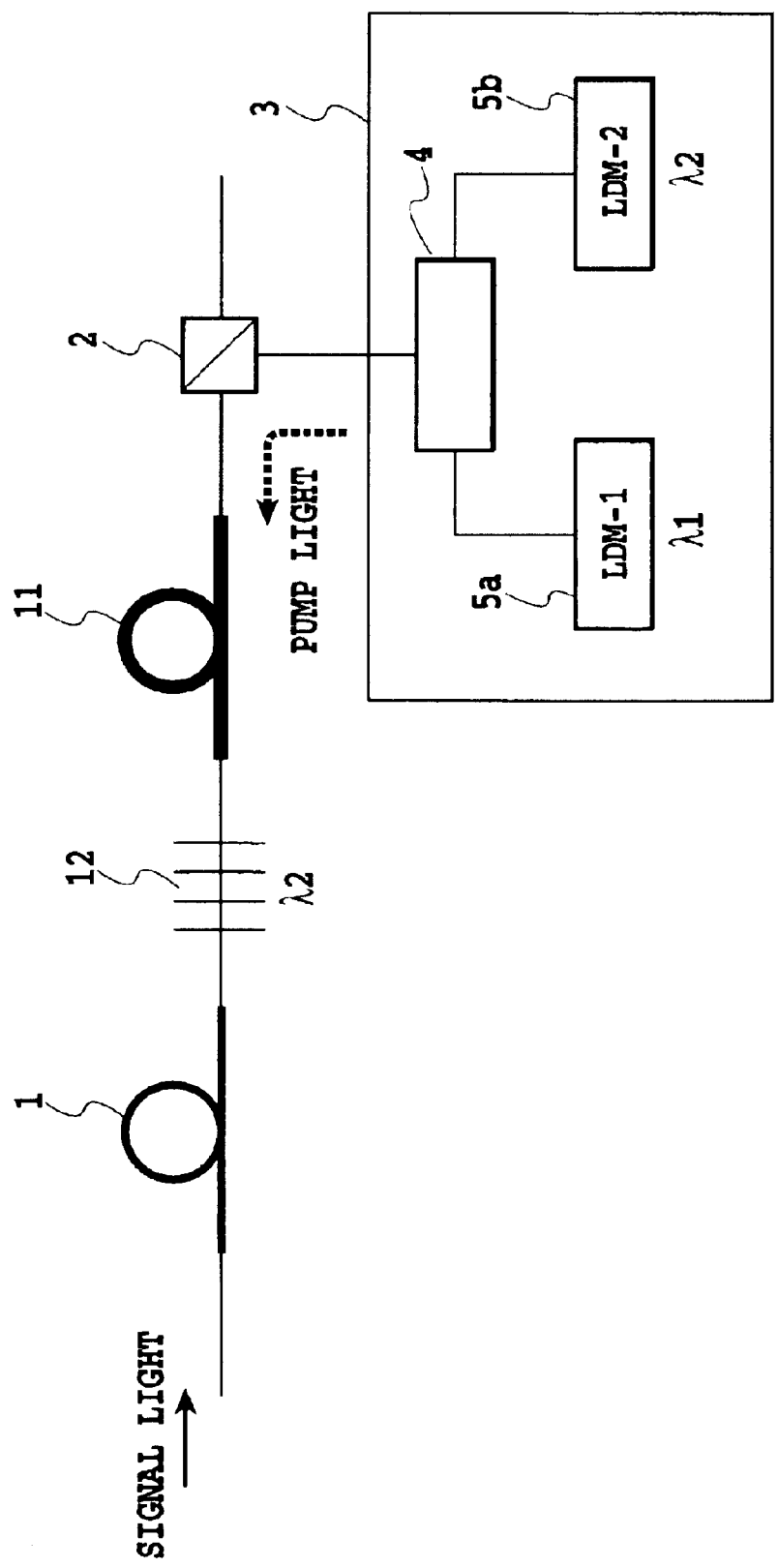
FIG. 8 is a diagram illustrating the structure of the Raman amplifier according to the fifth embodiment of the invention.

The fifth embodiment of the present invention is a tellurite Raman amplifier shown in FIG. 8 that has a tellurite fiber, a silica fiber, first and second laser sources for pump light of different wavelengths and a reflector installed between the tellurite fiber and the silica fiber to reflect either of the two pump beams emitted from the first and second laser sources.

Referring now to FIG. 8, a tellurite fiber 1, reflector 12, silica fiber 11 and coupler 2 are connected in series. The pump light($\lambda$1) emitted from the first laser source 5a and the pump light($\lambda$2) emitted from the second laser source 5b are combined in the coupler 4 and introduced into the silica fiber 11 via the coupler 2. The signal light is introduced from the side of the tellurite fiber (namely, the tellurite fiber is located in the upstream stage of the signal light).

The reflector 12 that selectively reflects only the pump light of wavelength $\lambda$2 can be a fiber grating.

In this embodiment, both pump light beams of wavelengths $\lambda$1 and $\lambda$2 introduced from the coupler 2 into the silica fiber 11 pump the silica fiber and then go out of the silica fiber. Only the pump light of wavelength $\lambda$2 is reflected by the reflector 12 and again enters the silica fiber 11 for pumping. Meanwhile, the pump light of wavelength $\lambda$1 passes the reflector 12 and enters the tellurite fiber 1 for pumping.

In this embodiment, as is the case with the fourth embodiment, the first bottom of the gain coefficient spectrum of the tellurite fiber provided by the pump light($\lambda$1) emitted from the first laser source is compensated by overlapping it on the peak of the gain coefficient spectrum of the silica fiber provided by the pump light ($\lambda$2). This compensation is attained by setting the difference between $\lambda$1 and $\lambda$2 at $\lambda 2-\lambda 1 = 25 \pm 15$ nm, namely, 10 nm<$\lambda 2-\lambda 1$<40 nm. The difference between $\lambda$1 and $\lambda$2 is more preferably 15 nm–35 nm, and most preferably 20–30 nm. In the wavelength range of pump light used for amplifying the signals of the 1.55 $\mu$m band, the difference in wavenumber corresponding to such a difference in wavelength, 10 nm–40 nm, is about 42–166 cm$^{-1}$.

Note that the gain coefficient spectrum of the whole Raman amplifier according to this embodiment is slightly different from that of the Raman amplifier according to the third and fourth embodiments using the pump light beams of the same wavelengths $\lambda$1 and $\lambda$2, because it includes the gain coefficient spectrum of the silica fiber pumped with the light of wavelength $\lambda$1 and that of the tellurite fiber pumped with the light of wavelength $\lambda$1 attenuated in the silica fiber.

In the present embodiment, it is preferable that the tellurite fiber 1 is located in the upstream stage of the signal light because of the reason described in the third embodiment. However, the same result is provided even if the system is configured so that the locations of the silica fiber 11 and the tellurite fiber 1 are exchanged, and the center wavelength of the reflector (fiber grating) is set at $\lambda$1, thereby the silica fiber being located in the upstream stage, and the pump light of wavelength $\lambda$1 pumping only the tellurite fiber 1.

EXAMPLE 6

In the Raman amplifier shown in FIG. 8, the wavelength $\lambda$1 of the first pump light emitted from LDM-1 was set at 1450 nm and its power at 300 mW. The wavelength $\lambda$2 of the second pump light emitted from LDM-2 was set at 1475 nm and its power at 200 mW. The tellurite fiber 1 and the silica fiber 11 were 200 m and 5 km long, respectively.

The Raman amplifier of this example provided a flat gain spectrum (flat gain bandwidth of 80 nm) over the about 1550–1630 nm wavelength region. Besides, in this embodiment, the power of the pump light of wavelength $\lambda$2 can be lowered than that in the fifth embodiment. This is because in the present configuration the reflector 12 has been installed so that the pump light of wavelength $\lambda$2 pumps only the silica fiber 11 due to the reflection by the reflector 12.

The Sixth Embodiment

Figure 9:
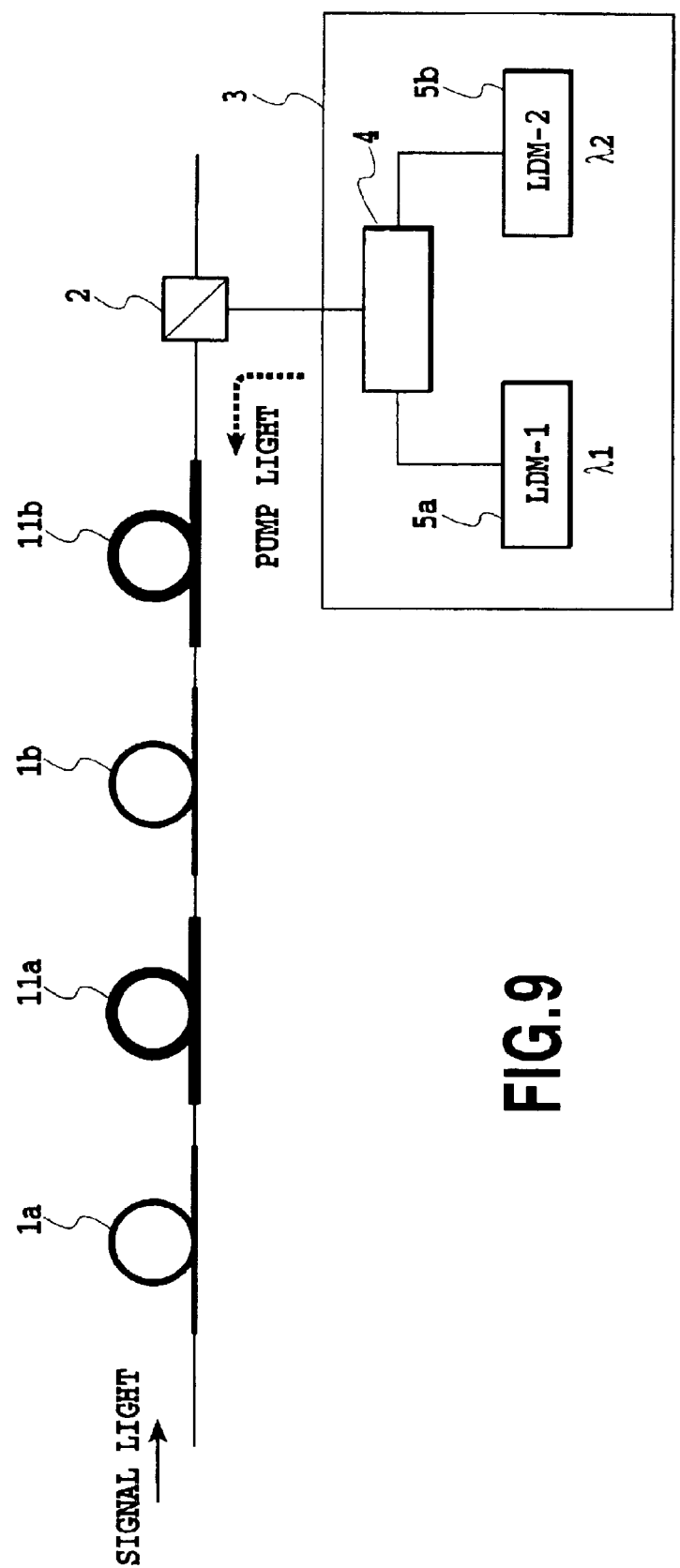
FIG. 9 is a diagram illustrating the structure of the Raman amplifier according to the sixth embodiment of the invention.

The sixth embodiment of the present invention is an optical fiber amplifier shown in FIG. 9 that has a plurality of tellurite fibers, a plurality of silica fibers, two laser sources of different wavelengths and a coupler combining the pump beams emitted from these laser sources. Those tellurite fibers and the silica fibers are located alternately.

In FIG. 9, the tellurite fibers 1a, 1b and silica fibers 11a, 11b are alternately located; and the coupler 2 is installed in the downstream stage of the signal light for those fibers. The pump light($\lambda$1) emitted from the first laser source 5a and the pump light($\lambda$2) emitted from the second laser source 5b are combined in the coupler 4, and then introduced into the alternately located fibers via the coupler 2.

The requirements that wavelengths $\lambda$1 and $\lambda$2 should meet are the same as those described in the fourth embodiment. The difference between $\lambda$1 and $\lambda$2 should be set at $\lambda 2-\lambda 1 = 25 \pm 15$ nm, namely, 10 nm<$\lambda 2-\lambda 1$<40 nm. The difference $\lambda 2-\lambda 1$ between $\lambda$1 and $\lambda$2 is more preferably 15 nm–35 nm, and most preferably 20 nm–30 nm. In the wavelength range of pump light used for amplifying the signals of the 1.55 $\mu$m band, the difference in wavenumber corresponding to such a difference in wavelength, 10 nm–40 nm, is about 42–166 cm$^{-1}$.

Although FIG. 9 shows an example where two tellurite fibers and two silica fibers are alternately located, they may be more than two, as far as they are alternately located.

Since this embodiment uses a plurality of short fibers, the noise figure can be reduced. If the gain coefficient in the first bottom or the second bottom of the gain spectrum of the tellurite fiber is small, the noise figure will rise because of the power loss in the tellurite fiber. The extent of this rise in noise figure is proportional to the length of the fiber, eventually, to the loss in fiber in dB values. That is, the noise figure of the short fibers used in this embodiment is lower than that of longer fibers. The signal in the first or second bottom of the tellurite fiber is pumped in the silica fiber installed in the following stage, and then signals of less noise can be provided.

In this embodiment, the tellurite fiber 1a is located in the most upstream stage in the direction the signal light travels. Nevertheless, since the increase in noise in each fiber is small in this embodiment, the same effects can be obtained even under the configuration in which the silica fiber 11a is installed in the most upstream stage.

EXAMPLE 7

In the Raman amplifier shown in FIG. 9, the wavelength of the pump light emitted from LDM-1 was set at 1450 nm and its power at 300 mW. The wavelength of the pump light emitted from LDM-2 was set at 1475 nm and its power at 300 mW. The tellurite fibers 1a, 1b were loom long; and the silica fibers 11a, 11b were 2.5 km long.

The Raman amplifier of this example provided a flat gain spectrum (flat gain bandwidth of 160 nm) over the about 1460–1620 nm wavelength region. In addition, while the noise figure in the spectrum of the fifth embodiment was 8 dB at the maximum, it was 6 dB at the maximum in this embodiment.

The Seventh Embodiment

Figure 10:
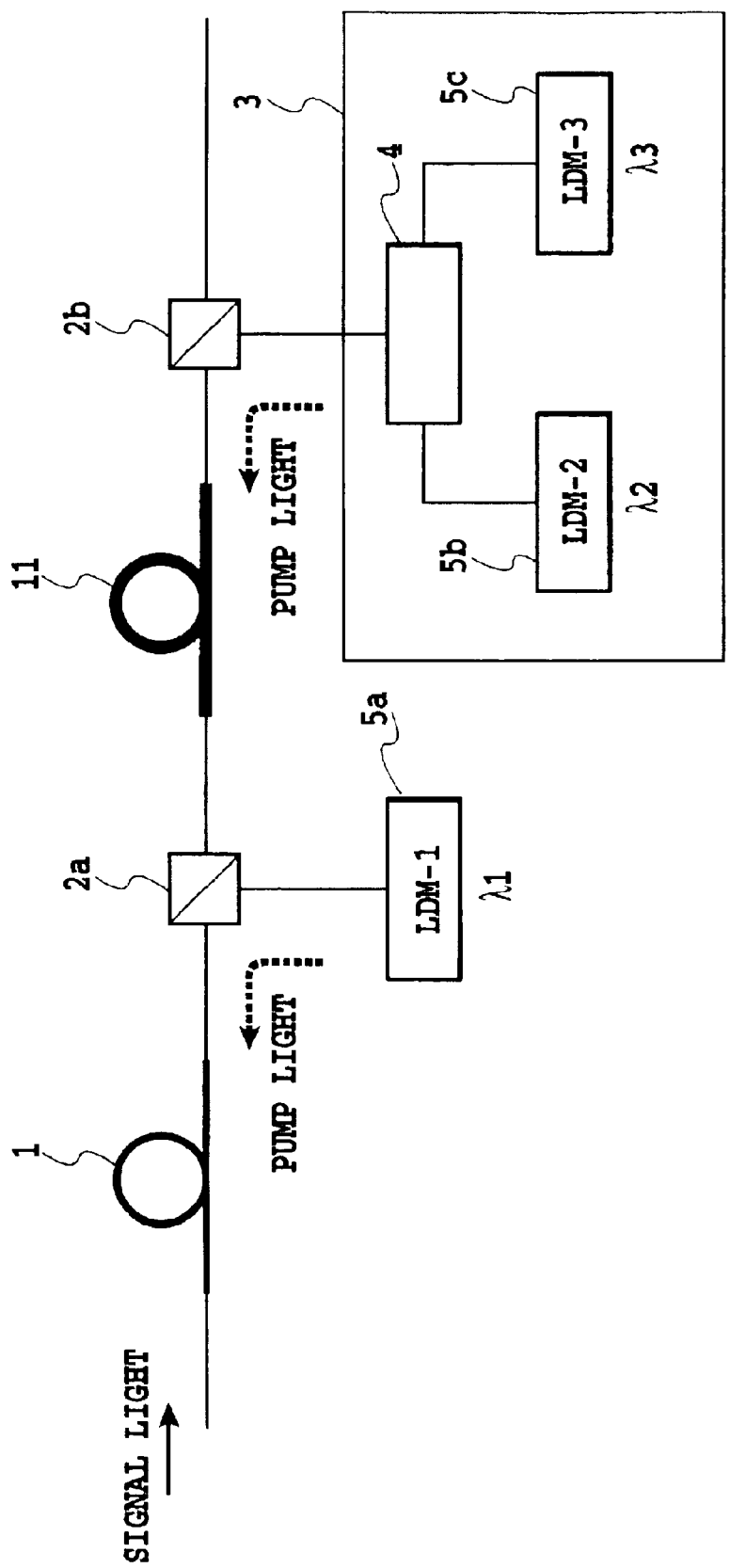
FIG. 10 is a diagram illustrating the structure of the Raman amplifier according to the seventh embodiment of the invention.

The seventh embodiment of the present invention is a tellurite Raman amplifier shown in FIG. 10 that has the first, second and third laser sources for pump light beams of different wavelengths, a tellurite fiber pumped with the pump light beam emitted from the first laser source and a silica fiber pumped with the pump light beams emitted from the second and third laser sources.

Referring now to FIG. 10, a tellurite fiber 1, a coupler 2a, a silica fiber 11 and a coupler 2b are connected in series. The signal light comes in the tellurite fiber 1 from the left side. The first pump light ($\lambda$1) emitted from the first laser source 5a enters the tellurite fiber 1 via the coupler 2a. The second and third pump light ($\lambda$2 and $\lambda$3) emitted from the second and third laser sources 5b and 5c are combined in the coupler 4 and then introduced into the silica fiber 11 via the coupler 2b.

Figure 2:
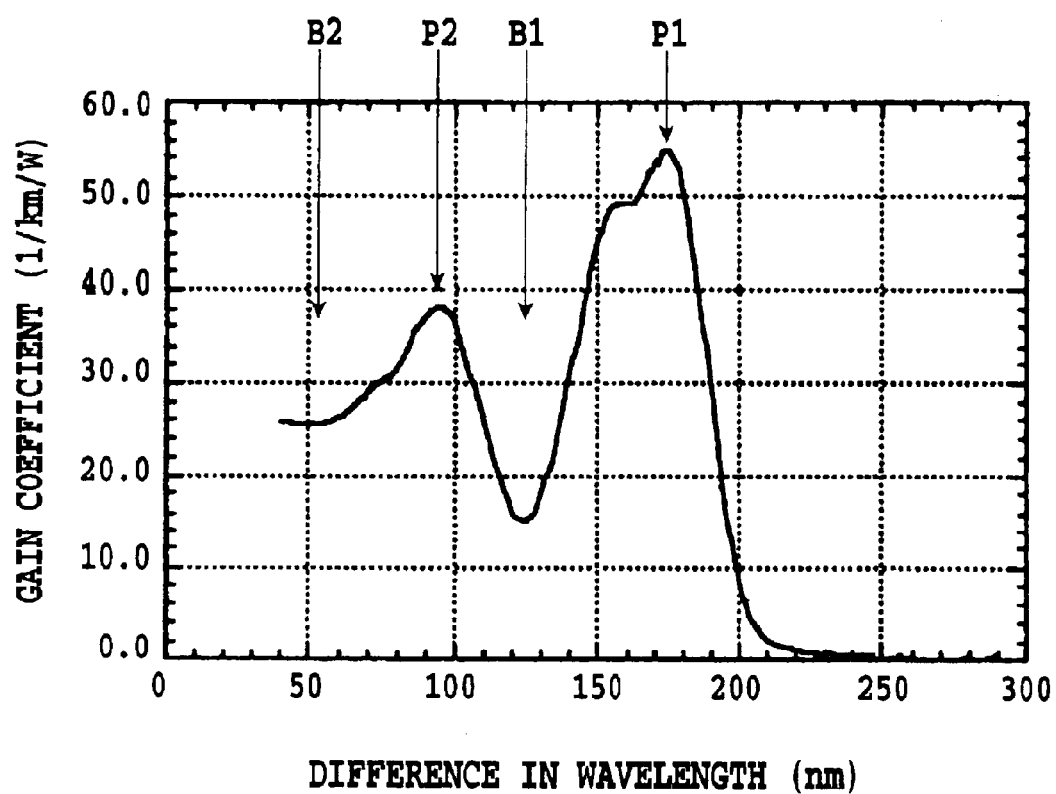
FIG. 2 is a diagram illustrating the gain coefficient spectrum of a tellurite Raman amplifier using pump light of a single wavelength.

In this embodiment, $\lambda$2 is controlled so that the peak in the gain spectrum of the silica Raman amplifier pumped with the light of wavelength $\lambda$2 is located at the first bottom B1 of the gain spectrum of the tellurite Raman amplifier shown in FIG. 2. On the other hand, $\lambda$3 is controlled so that the peak in the gain spectrum of the silica Raman amplifier pumped with the light of wavelength $\lambda$3 is located at the second bottom B2 of the gain spectrum of the tellurite Raman amplifier shown in FIG. 2. As a result of such settings, a flat gain spectrum is obtained over a wide wavelength region, since both of the first and second bottoms in the gain spectrum of the tellurite Raman amplifier are compensated by the two peaks in the gain spectrum of the silica Raman amplifier.

This compensation is attained by setting the difference between $\lambda$1 and $\lambda$2 at $\lambda$2-$\lambda$1=25±15 nm, namely, 10 nm<$\lambda$2-$\lambda$1<40 nm. This difference corresponds to a difference of 42–166 cm$^{-1}$ in wavenumber between the first pump light and the second pump light in the wavelength band of interest in this embodiment. Besides, the difference between $\lambda$1 and $\lambda$3 is set at $\lambda$1-$\lambda$3=40±30 nm, namely, 10 nm<1-$\lambda$3<70 nm. This difference corresponds to a difference of 42–166 cm$^{-1}$ in wavenumber between the first pump light and the third pump light in the wavelength band of interest in this embodiment.

In the present embodiment, it is preferable that the tellurite fiber is located in the upstream stage of the signal light because of the reason described in the fourth embodiment. However, it is also possible to install the silica fiber in the upstream stage.

EXAMPLE 8

Figure 11A:
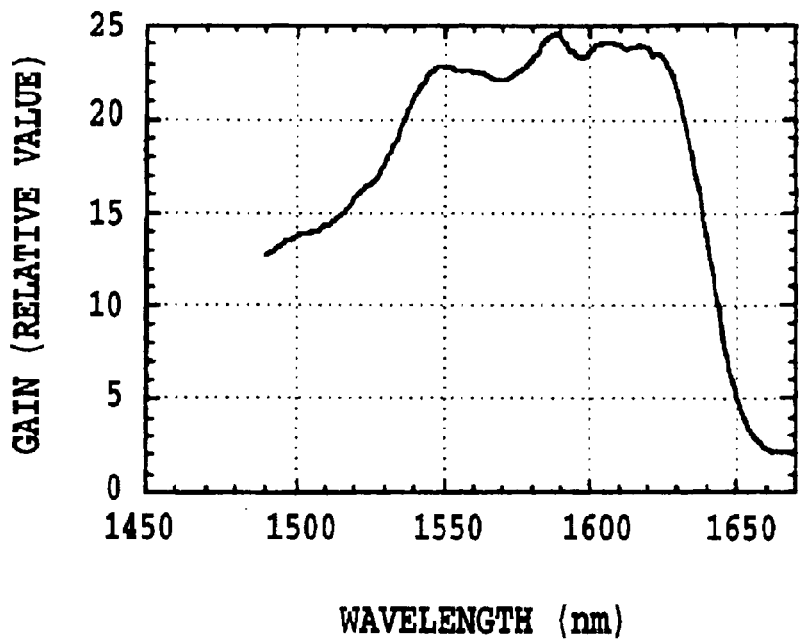
FIG. 11 illustrates the gain spectra of the Raman amplifier according to the seventh embodiment of the invention, FIG. 11A showing the gain spectrum (relative value in dB values) obtained in Example 4 for comparison, and FIG. 11B showing the gain spectrum (relative value in dB values) obtained in Example 8.
Figure 11B:
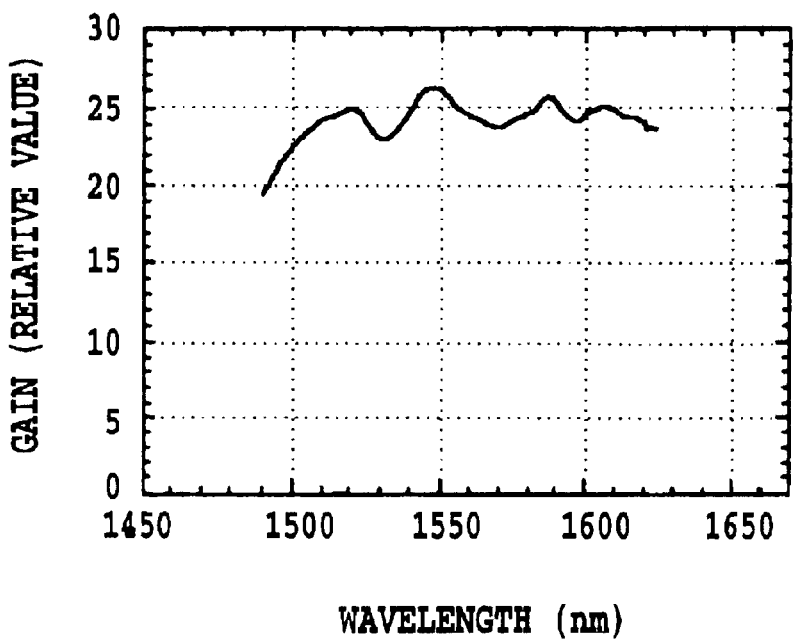

In the Raman amplifier shown in FIG. 10, the wavelength of the first pump light emitted from LDM-1 was set at 1450 nm and its power at 300 mW. The wavelength of the second pump light emitted from LDM-2 was set at 1475 nm and its power at 150 mW. The wavelength of the third pump light emitted from LDM-3 was set at 1410 nm and its power at 150 mW. The tellurite fiber 1 and the silica fiber 11 were 200 m and 5 km long, respectively. FIG. 11B demonstrates the gain spectrum of the Raman amplifier according to the present embodiment.

The Raman amplifier of this example provided a flat gain spectrum (flat gain bandwidth of 130 nm) over the about 1500–1630 nm wavelength range.

The Eighth Embodiment

Figure 12:
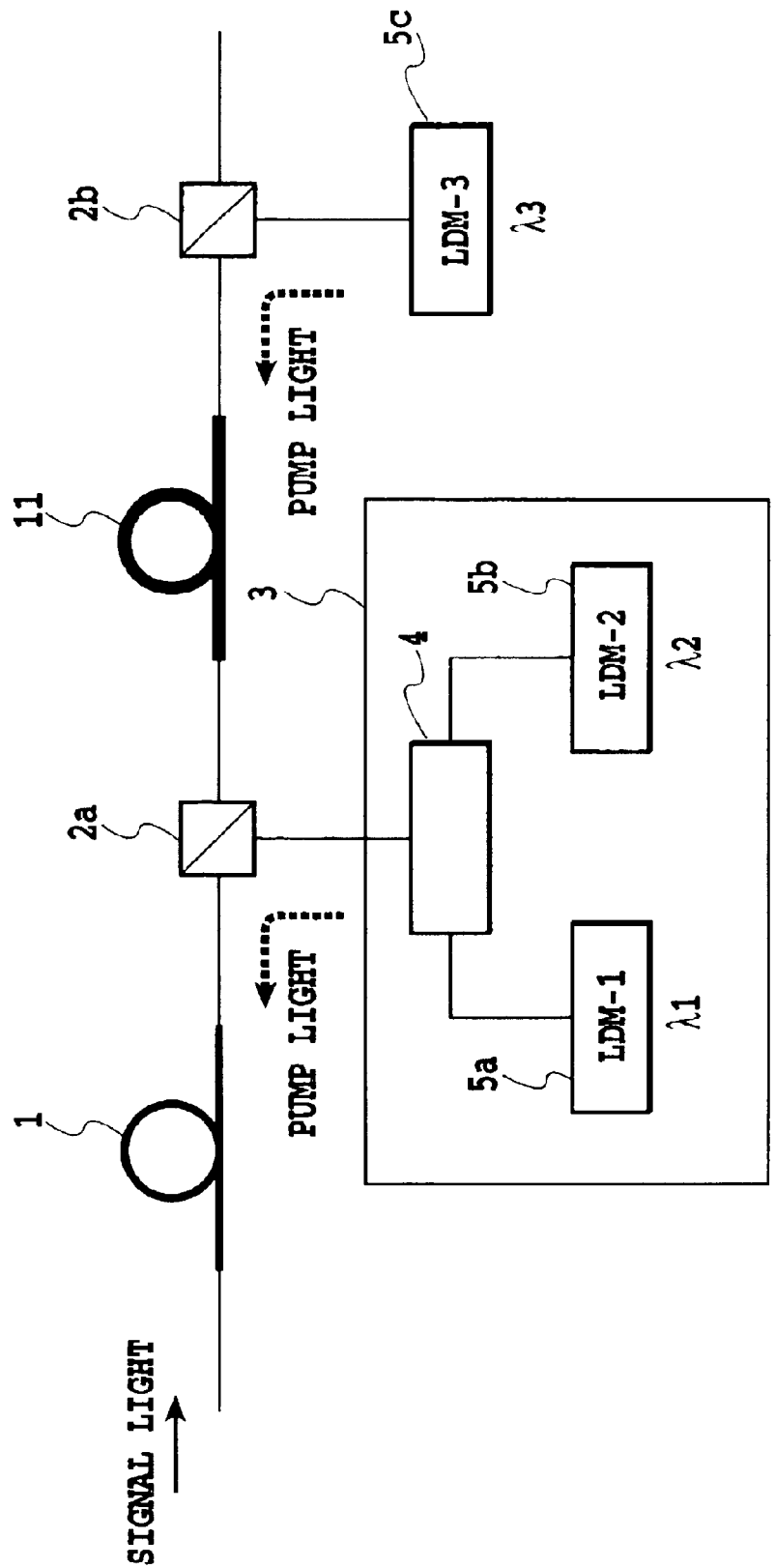
FIG. 12 is a diagram illustrating the structure of the Raman amplifier according to the eighth embodiment of the invention.

The eighth embodiment of the present invention is a tellurite Raman amplifier shown in FIG. 12 that has first, second and third laser sources for pump light beams of different wavelengths, a tellurite fiber pumped with the pump light beams emitted from the first and second laser sources and a silica fiber pumped with the pump light beam emitted from the third laser source.

Referring now to FIG. 12, a tellurite fiber 1, a coupler 2a, a silica fiber 11 and a coupler 2b are connected in series. The signal light comes in the tellurite fiber 1 from the left side. The first and second pump light beams ($\lambda$1 and $\lambda$2) emitted from the first and second laser sources 5a, 5b are combined in the coupler 4 and then introduced into the tellurite fiber 1 via the coupler 2a. The third pump light beam ($\lambda$3) emitted from the third laser source 5c enters the silica fiber 11 via the coupler 2b.

In this embodiment, $\lambda$2 is controlled so that the first peak P1 in the gain spectrum of the tellurite Raman amplifier pumped with the light of wavelength $\lambda$2 is located at the first bottom B1 of the gain spectrum of the tellurite Raman amplifier pumped with the light of wavelength $\lambda$1. Through this setting, the second peak P2 in the gain spectrum of the tellurite Raman amplifier pumped with the light of wavelength $\lambda$2 is located in the second bottom B2 in the gain spectrum of the tellurite Raman amplifier pumped with the light of wavelength $\lambda$1. On the other hand, $\lambda$3 is controlled so that the peak in the gain spectrum of the silica Raman amplifier pumped with the light of wavelength $\lambda$3 is located at the first bottom B1 of the gain spectrum of the tellurite Raman amplifier pumped with the light of wavelength $\lambda$1. Namely, in this embodiment, the first bottom B1 in the gain spectrum provided by the pump light of wavelength $\lambda$1 is compensated by the peak in the gain spectrum provided by the pump beams of wavelengths $\lambda$2 and $\lambda$3, while the second bottom B2 in the gain spectrum provided by the pump light of wavelength $\lambda$1 is compensated by the second peak P2 in the gain spectrum provided by the pump beam of wavelength $\lambda$2. As a result of such settings, a flat gain spectrum is obtained over a wide wavelength range. However, in general, the flatness of the spectrum is inferior to that provided by the seventh embodiment. Thus it is preferable to install a gain equalizer between the tellurite fiber 1 and the silica fiber 11, preferably, between the coupler 2a and the silica fiber 11, for higher flatness.

This compensation is attained by setting the difference between $\lambda$1 and $\lambda$2 at $\lambda$2-$\lambda$1=40±30 nm, namely, 10 nm<$\lambda$2-$\lambda$1<70 nm. This difference corresponds to a difference of 42–290 cm$^{-1}$ in wavenumber between the first pump light and the second pump light in the wavelength band of interest in this embodiment. Besides, the difference between $\lambda$1 and $\lambda$3 is set at $\lambda$1-$\lambda$3=25±15 nm, namely, 10 nm<$\lambda$1-$\lambda$3<40 nm. This difference corresponds to a difference of 42–166 cm$^{-1}$ in wavenumber between the first pump light and the third pump light in the wavelength band of interest in this embodiment.

In the configuration of this embodiment, the depth of the first bottom (gap between the gain coefficients at the first peak and the first bottom) in the spectrum of the tellurite fiber installed in the upstream of the signal light is smaller than that seen in the seventh embodiment where the tellurite fiber is pumped with light of a single wavelength. Therefore, it is possible to raise the minimum gain of the tellurite fiber around the first bottom. As a result, the noise figure is reduced and the signal output is raised.

Figure 13:
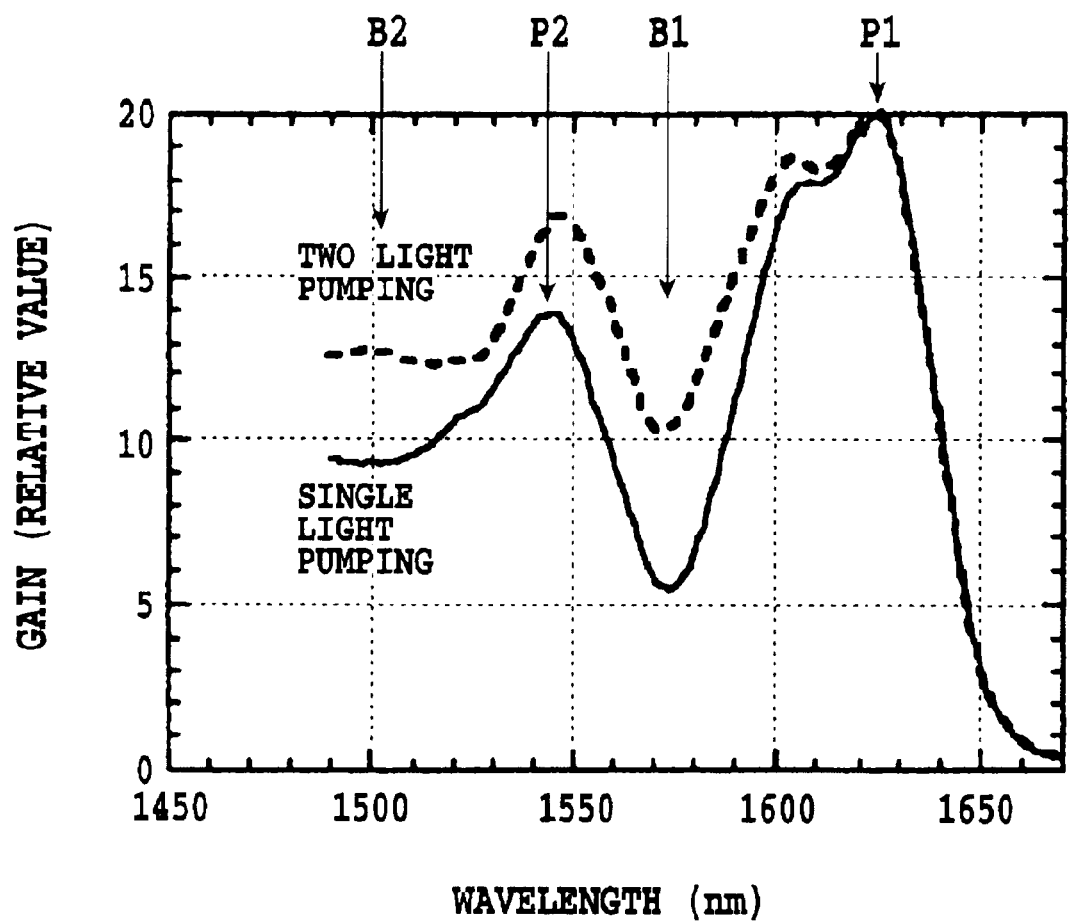
FIG. 13 is a graph illustrating the Raman gain of the tellurite fiber pumped with light of a single wavelength and that of two wavelengths.

The above effect is specifically explained below. FIG. 13 is a diagram illustrating the gain spectrum (solid line, on-off gain) provided by a single-wavelength pumping using pump light of wavelength $\lambda$1 and the gain spectrum (dotted line, on-off gain) provided by two-wavelength pumping using pump light beams of wavelengths $\lambda$1 and $\lambda$2. The insertion loss caused by the tellurite fiber and optical components such as adjacent couplers is about 6 dB. Thus in the case of the single-wavelength pumping, the net Raman gain at the first bottom B1 is about −0.5 dB. Meanwhile, in the case of the two-wavelength pumping, the net Raman gain is about 4 dB in the same region, considerably larger than that provided by the single-wavelength pumping.

When the tellurite fiber pumped with the two-wavelength pumping is used along with the silica fiber pumped with the single-wavelength pumping, it is necessary to control the ratio between the gain coefficient(unit: dB) at the first peak in the gain spectrum of the tellurite fiber pumped with the two-wavelength pumping and the gain coefficient(unit: dB) at the second peak. As shown in FIG. 2, the ratio, gain coefficient at the first peak P1 gain coefficient at the second peak P2, is 100:70 during the single-wavelength pumping. When implementing the two-wavelength pumping, the ratio between the gain coefficient at the first peak P1 and that at the second peak P2 should lie between 100:80 and 100:100. Under such settings, a good matching is provided for the gain spectra for the tellurite fiber and the silica fiber, presenting a gain spectrum flatter than those resulting from the other settings for the above ratio.

Figure 1A:
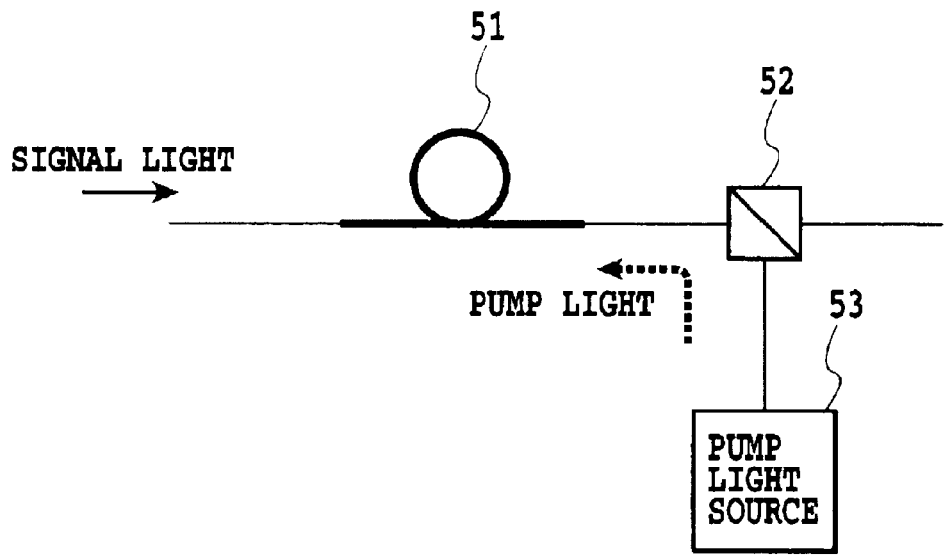
FIG. 1 is a diagram illustrating the silica Raman amplifier of prior art and its gain coefficient spectrum, FIG. 1A showing the structure of the silica Raman amplifier, and FIG. 1B showing its gain coefficient spectrum.
Figure 1B:
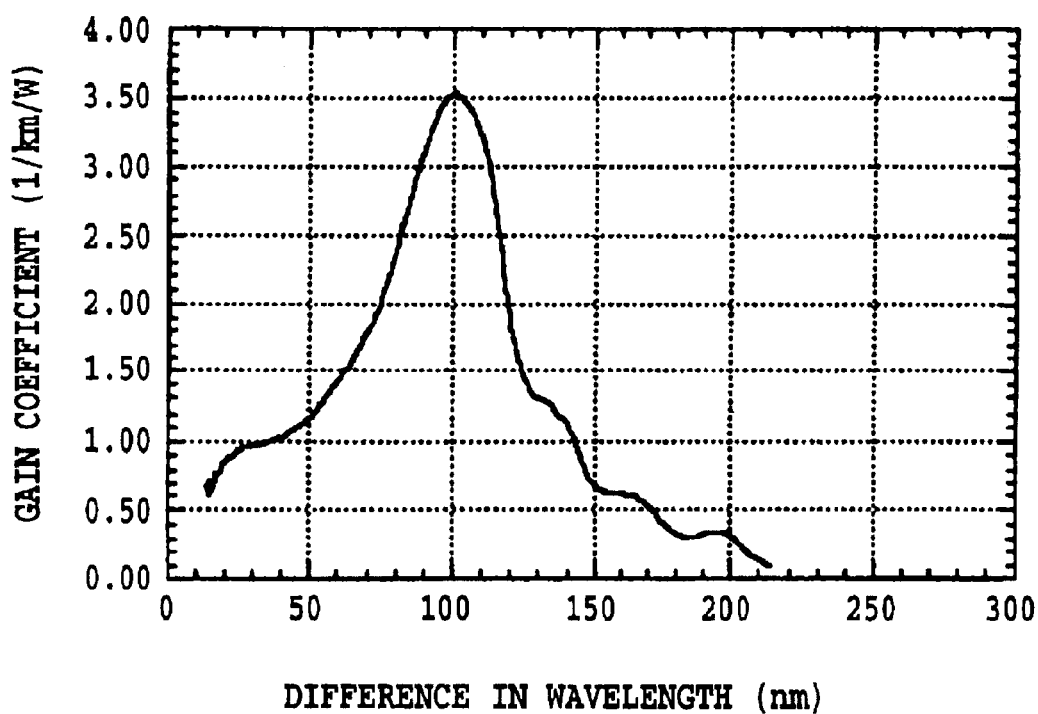

Considering the asymmetric spectrum of the gain coefficient for the silica fiber, the gain coefficient at the second peak should be lower than that at the first peak. As shown in FIG. 1B, the gain coefficient of the silica fiber falls more slowly at shorter wavelengths of the peak than at longer wavelengths. When the gain peak for the silica fiber overlaps the first bottom for the tellurite fiber, the gain spectrum at the second peak P2 of the tellurite fiber is compensated by overlap of the slowly declining gain spectrum of the silica fiber. On the other hand, the gain spectrum at the first peak of the tellurite fiber is not compensated by the gain spectrum of the silica fiber almost at all. Thus a flat gain spectrum as a whole can be provided for the amplifier system by reducing the second peak in the gain spectrum of the tellurite fiber in advance.

EXAMPLE 9

In the Raman amplifier shown in FIG. 12, the wavelength of the first pump light emitted from LDM-1 was set at 1450 nm and its power at 200 mW. The wavelength of the second pump light emitted from LDM-2 was set at 1410 nm and its power at 200 mW. The wavelength of the third pump light emitted from LDM-3 was set at 1475 nm and its power at 200 mW. The tellurite fiber 1 and the silica fiber 11 were 200 m and 5 km long, respectively.

The Raman amplifier of this example provided a flat gain spectrum (flat gain bandwidth of 80 nm) over the about 1550 nm–1630 nm wavelength region.

The Ninth Embodiment

Figure 14:
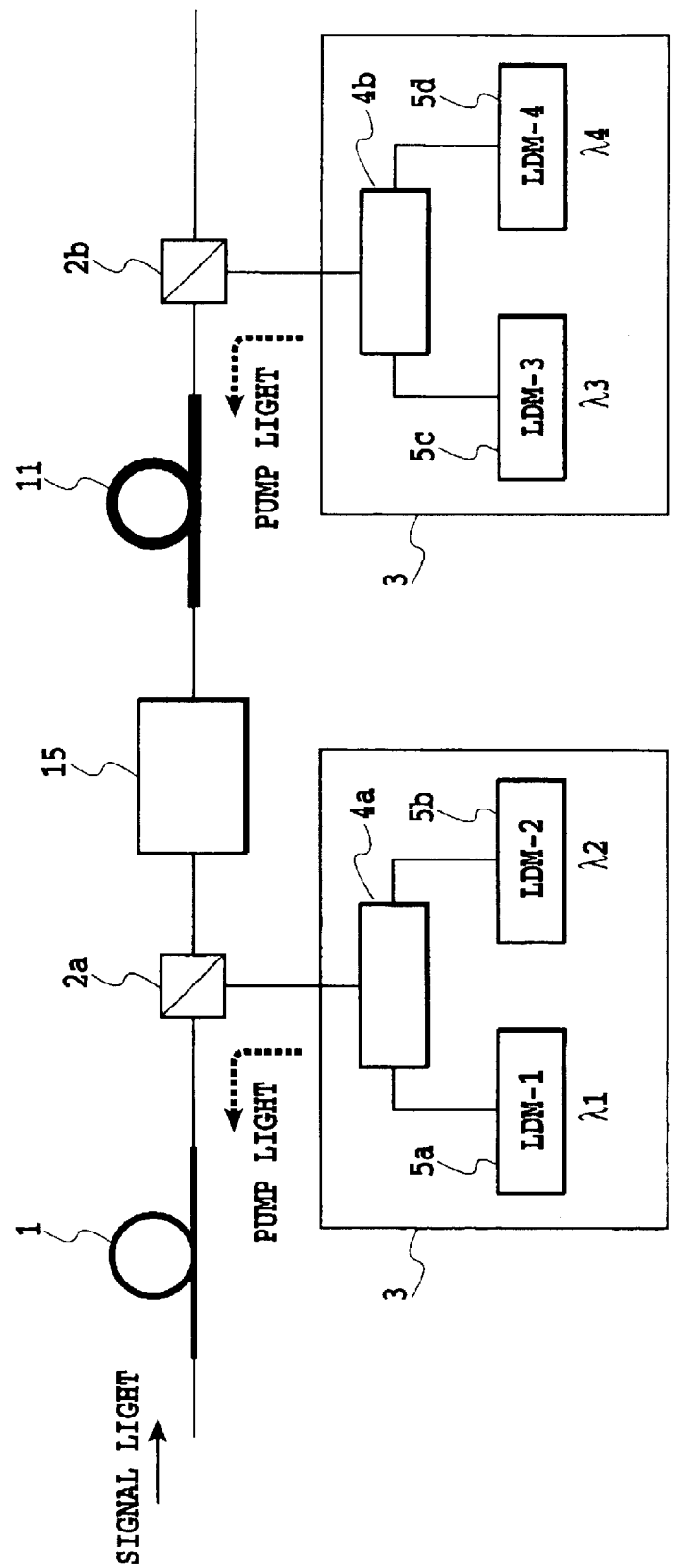
FIG. 14 is a diagram illustrating the structure of the Raman amplifier according to the ninth embodiment of the invention.

The ninth embodiment of the present invention is a tellurite Raman amplifier shown in FIG. 14 that has first, second, third and fourth laser sources for pump light beams of different wavelengths, a tellurite fiber pumped with the pump light beams emitted from the first and second laser sources and a silica fiber pumped with the pump light beams emitted from the third and fourth laser sources.

Referring now to FIG. 14, a tellurite fiber 1, a coupler 2a, a gain equalizer 15, a silica fiber 11 and a coupler 2b are connected in series. The signal light is introduced into the tellurite fiber 1 from the left side. The first and second pump light beams emitted from the first and second laser sources 5a, 5b are combined in the coupler 4a and then enter the tellurite fiber 1 via the coupler 2a. The third and fourth pump light beams emitted from the third and fourth laser sources 5c, 5d are combined in the coupler 4b and then enter the tellurite fiber 1 via the coupler 2b.

In this embodiment, $\lambda 2$ is controlled as described in the eighth embodiment so as to compensate the first bottom B1 of the gain spectrum of the tellurite Raman amplifier pumped with the light of wavelength $\lambda 1$. On the other hand, $\lambda 3$ is controlled so that the peak in the gain spectrum of the silica Raman amplifier pumped with the light of wavelength $\lambda 3$ compensates the first bottom B1 of the gain spectrum of the tellurite Raman amplifier pumped with the light of wavelength $\lambda 1$. Further, $\lambda 4$ is controlled so that the peak in the gain spectrum of the silica Raman amplifier pumped with the light of wavelength $\lambda 4$ is located at the second bottom B2 of the gain spectrum of the tellurite Raman amplifier pumped with the light of wavelength $\lambda 1$. As a result of such settings, a flat gain spectrum is obtained over a wide wavelength range because both gain coefficients at the first and second bottoms B1 and B2 provided by the pump light of wavelength $\lambda 1$ are compensated. However, in general, the flatness of this spectrum is inferior to that provided by the seventh embodiment. Thus it is preferable to install a gain equalizer 15 between the tellurite fiber and the silica fiber for higher flatness of the gain spectrum.

Also in the configuration of this embodiment, since the tellurite fiber is pumped with the pump light beams of two wavelengths, the minimum gain at the first bottom B1 in the spectrum of the tellurite fiber installed in the upstream stage of the signal light can be raised. As a result, the noise figure is reduced and the signal output is raised. The conditions of the gain coefficient ratio for providing such effects are the same as those described in the eighth embodiment.

The above compensation is attained by setting the difference between $\lambda 1$ and $\lambda 2$ at $\lambda 1-\lambda 2=50\pm 20$ nm, namely, 30 nm<$\lambda 1-\lambda 2$<70 nm. This difference corresponds to a difference of 84–290 cm$^{-1}$ in wavenumber between the first pump light and the second pump light. Besides, the difference between $\lambda 1$ and $\lambda 3$ is set at $\lambda 3-\lambda 1=25\pm 15$ nm, namely, 10 nm<$\lambda 3-\lambda 1$<40 nm. This difference corresponds to a difference of 42–166 cm$^{-1}$ in wavenumber between the first pump light and the third pump light. In addition, the difference between $\lambda 1$ and $\lambda 4$ is set at $\lambda 1-\lambda 4=40\pm 30$ nm, namely, 10 nm<$\lambda 1-\lambda 4$<70 nm. This difference corresponds to a difference of 42–290 cm$^{-1}$ in wavenumber between the first pump light and the fourth pump light.

EXAMPLE 10

In the Raman amplifier shown in FIG. 14, the wavelength of the first pump light emitted from LDM-1 was set at 1450 nm and its power at 200 mW. The wavelength of the second pump light emitted from LDM-2 was set at 1410 nm and its power at 200 mW. The wavelength of the third pump light emitted from LDM-3 was set at 1475 nm and its power at 150 mW. The wavelength of the fourth pump light emitted from LDM-4 was set at 1400 nm and its power at 150 mW. The tellurite fiber 1 and the silica fiber 11 were 200 m and 5 km long, respectively.

The Raman amplifier of this example provided a flat gain spectrum (flat gain bandwidth of 130 nm) over the about 1500 nm–1630 nm wavelength range.

The Tenth Embodiment

Figure 15:
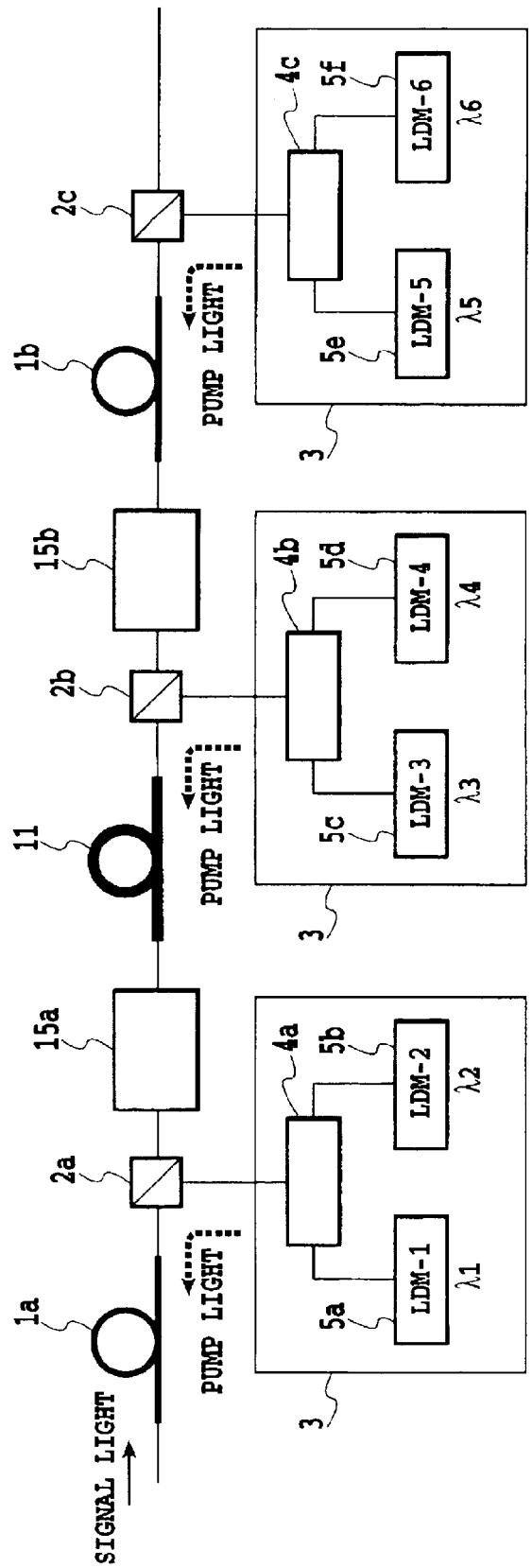
FIG. 15 is a diagram illustrating the structure of the Raman amplifier according to the tenth embodiment of the invention.

The tenth embodiment of the present invention is a tellurite Raman amplifier shown in FIG. 15 that has first to sixth laser sources for pump light beams of different wavelengths, a first tellurite fiber pumped with the pump light beams emitted from the first and second laser sources, a silica fiber pumped with the pump light beams emitted from the third and fourth laser sources, and a second tellurite fiber pumped with the pump light beams emitted from the fifth and sixth laser sources.

Referring now to FIG. 15, the first tellurite fiber 1a, a coupler 2a, a gain equalizer 15a, a silica fiber 11, a coupler 2b, a gain equalizer 15b, the second tellurite fiber 1b, and a coupler 2c are connected in series. Signal light is introduced into the first tellurite fiber 1a from the left side. The first and second pump light beams($\lambda$1, $\lambda$2) emitted from the first and second laser sources 5a, 5b are combined in the coupler 4a and then enter the first tellurite fiber 1a via the coupler 2a. The third and fourth pump light beams($\lambda$3, $\lambda$4) emitted from the third and fourth laser sources 5c, 5d are combined in the coupler 4b and then enter the silica fiber 11 via the coupler 2b. The fifth and sixth pump light beams emitted from the fifth and sixth laser sources 5e, 5f are combined in the coupler 4c and then enter the second tellurite fiber 1b via the coupler 2c.

This embodiment is a configuration capable of further improving the amplifier output level than the ninth embodiment. In the Raman amplifier of the ninth embodiment using the tellurite fiber shown in FIG. 14 installed in the former stage, the amplifier output level becomes low at wavelengths other than the flat gain wavelength range of the silica fiber, because the flat gain wavelength range of the silica fiber is narrower than that of the tellurite fiber. In contrast, in the Raman amplifier having the silica fiber in the former stage opposite to the configuration of FIG. 14, the noise figure becomes high at wavelengths range other than the flat gain wavelength range of the silica fiber. The amplifier according to the present embodiment overcomes the above drawbacks by using the second tellurite fiber 1b. Namely, since the second tellurite fiber 1b located in the output stage downstream of the silica fiber 11 has a wider wavelength range of flat gain, it becomes possible to prevent a decrease of amplifier output level at wavelengths other than the flat gain wavelength region of the silica fiber.

Further, since the more wideband tellurite fiber is employed in the input stage as well, the noise figure can be reduced. Also in the configuration according to the present embodiment, since the first tellurite fiber 1a is pumped with the pump light of two wavelengths, the noise figure is lowered and the output level of signal light is raised at the first bottom B1 in the gain spectrum of the tellurite fiber, as is the case with the eighth embodiment. The conditions of the gain coefficient ratio for providing such effects are the same as those described in the eighth embodiment.

The conditions that $\lambda$1, $\lambda$2, $\lambda$3 and $\lambda$4 must meet are the same as those for the ninth embodiment. The settings for $\lambda$5 and $\lambda$6 are the same as those for $\lambda$1 and $\lambda$2. Namely, $\lambda$6 is controlled so that the first peak in the gain spectrum of the tellurite Raman amplifier pumped with the light of wavelength $\lambda$6 is located at the first bottom B1 of the gain spectrum of the tellurite Raman amplifier pumped with the light of wavelength $\lambda$5. The difference between $\lambda$5 and $\lambda$6 in this setting becomes $\lambda$5−$\lambda$6=40±30 nm, namely, 10 nm<$\lambda$5−$\lambda$6<70 nm. This difference corresponds to a difference of 125–290 cm$^{-1}$ in wavenumber between the fifth pump light and the sixth pump light. Although $\lambda$5 and $\lambda$6 can be controlled independently of $\lambda$1 and $\lambda$2, the settlings for $\lambda$5 and $\lambda$6 is preferably the same as those for $\lambda$1 and $\lambda$2.

In the configuration shown in FIG. 15, the laser sources 5e and 5f for the second tellurite fiber are provided separately from the laser sources 5a and 5b for the first tellurite fiber. However, as shown in FIG. 5, the complex pump light obtained by coupling the pump light beams emitted from the laser sources 5a and 5b may be divided and then supplied to both of the first and second tellurite fibers.

EXAMPLE 11

In the Raman amplifier shown in FIG. 15, the wavelength of the first pump light emitted from LDM-1 was set at 1450 nm and its power at 200 mW. The wavelength of the second pump light emitted from LDM-2 was set at 1410 nm and its power at 200 mW. The wavelength of the third pump light emitted from LDM-3 was set at 1475 nm and its power at 150 mW. The wavelength of the fourth pump light emitted from LDM-4 was set at 1400 nm and its power at 150 mW. The wavelength of the fifth pump light emitted from LDM-5 was set at 1450 nm and its power at 200 mW. The wavelength of the sixth pump light emitted from LDM-6 was set at 1410 nm and its power at 200 mW. The first tellurite fiber 1a, the silica fiber 11, and the second tellurite fiber 1b were 200 m, 5 km and 200 m long, respectively.

The Raman amplifier of this example provided a flat gain spectrum (flat gain bandwidth of 130 nm) over the about 1500 nm–1630 nm wavelength region. The output level of the Raman amplifier according to the present embodiment was 20 dBm, greater than 18 dBm provided by the amplifier of Example 10.

The Eleventh Embodiment

Figure 16:
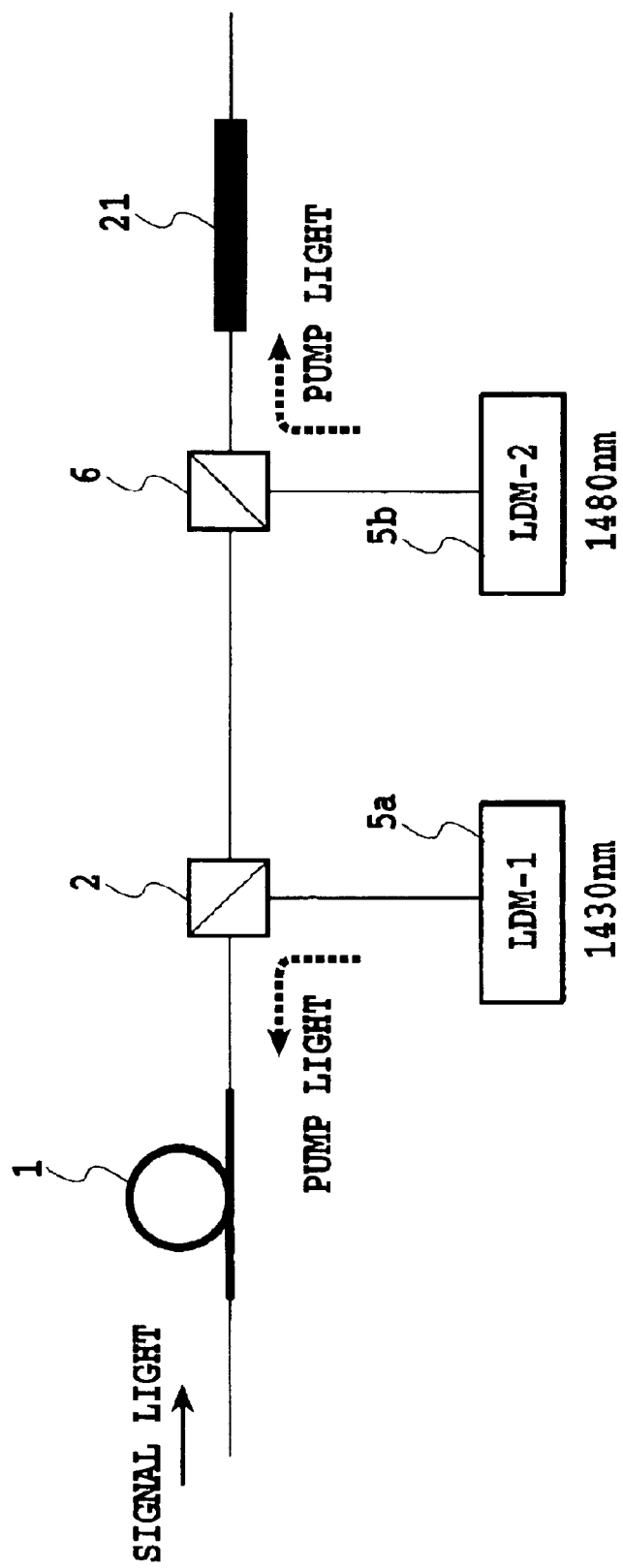
FIG. 16 is a diagram illustrating the structure of the Raman amplifier according to the eleventh embodiment of the invention.

The eleventh embodiment of the present invention is a tellurite Raman amplifier shown in FIG. 16 that has first and second laser sources for pump light of different wavelengths, a tellurite fiber pumped with the first pump light emitted from the first laser source and an Erbium-doped fiber pumped with the second pump light emitted from the second laser source.

Referring now to FIG. 16, the tellurite fiber 1, a coupler 2, another coupler 6 and the Erbium-doped fiber 21 are connected in series. The signal light is introduced into the tellurite fiber 1 from the left side (namely, the tellurite fiber 1 is located in the upstream stage in the incident direction of signal light). The first pump light($\lambda$1) emitted from the first laser source 5a enters the tellurite fiber 1 via the coupler 2. Meanwhile, the second pump light($\lambda$2) emitted from the second laser source 5b enters the Erbium-doped fiber 21 via the coupler 6.

In this embodiment, $\lambda$1 is controlled so that the peak in the gain spectrum of the Erbium(Er)-doped fiber compensates the first bottom B1 in the gain spectrum of the tellurite Raman amplifier pumped with the light of wavelength $\lambda$1. A flat spectrum is obtained over a wide wavelength range by compensating the gain coefficient at the first bottom B1 in the gain spectrum provided by the pump light of wavelength 1.

Available Er-doped fibers include Er-doped tellurite fibers, Er-doped fluoride fibers and Er-doped silica fibers. Typically, the gain spectrum of the Er-doped fiber has a peak at around 1530–1570 nm. The wavelength $\lambda$2 used in the pump laser for the Er-doped fiber is 1450–1500 nm; preferably, $\lambda$2 is 1480 nm. Although the Er-doped fiber takes the configuration for forward pumping in FIG. 16, it may take the configuration for backward pumping.

Since the Er-doped fiber has a narrow peak in its gain spectrum, the tellurite fiber 1 having a wider range of flat gain should be installed in the upstream stage of the incident direction of signal light.

On the other hand, since the wavelength $\lambda$1 is controlled so that the peak in the gain spectrum of Erbium(Er)-doped fiber compensates the first bottom B1 in the gain spectrum of the tellurite Raman amplifier pumped with the light of wavelength $\lambda$1, $\lambda$1 is 1400–1450 nm and preferably 1430 nm.

EXAMPLE 12

In the Raman amplifier shown in FIG. 16, the wavelength of the first pump light emitted from LDM-1 was set at 1430 nm and its power at 200 mW. The wavelength of the second pump light emitted from LDM-2 was set at 1480 nm and its power at 200 mW. The tellurite fiber 1 and the Er-doped fiber 21 were 200 m and 5 m long, respectively. The concentration of doped Erbium was 2000 ppm by weight.

The Raman amplifier of this example provided a flat gain spectrum (flat gain bandwidth of 80 nm) over the about 1520–1600 nm wavelength region.

The Twelfth Embodiment

Figure 17:
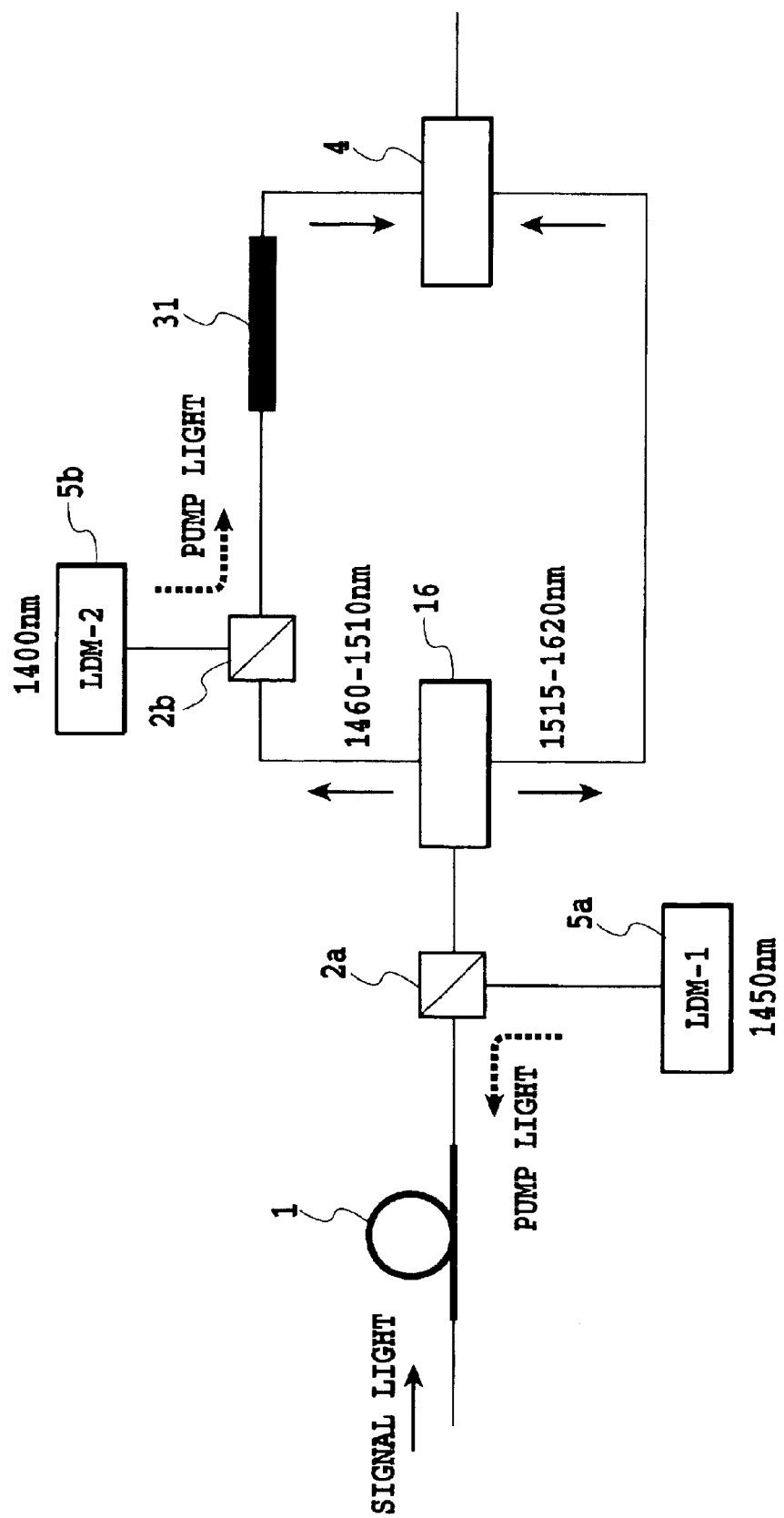
FIG. 17 is a diagram illustrating the structure of the Raman amplifier according to the twelfth embodiment of the invention.

The twelfth embodiment of the present invention is a tellurite Raman amplifier shown in FIG. 17 that has a tellurite fiber, a first laser source for pumping the tellurite fiber, a wavelength-selective splitter for dividing signal light amplified in the tellurite fiber selectively according to wavelength, a Thulium(Tm)-doped fiber where one branch of divided signal light enters, a second laser source for pumping the Tm-doped fiber, and a coupler that combines the signal light amplified in the Tm-doped fiber and the other branch of signal light divided with the splitter.

Referring now to FIG. 17, a tellurite fiber 1, a coupler 2a and a wavelength-selective splitter 14 are connected in series. The signal light comes in the tellurite fiber 1 from the left side (namely, the tellurite fiber 1 is located in the upstream stage in the incident direction of signal light). The first pump light($\lambda$1) emitted from the first laser source 5a enters the tellurite fiber 1 via the coupler 2a. Signal light is split by the wavelength-selective splitter 14 into the signal branch of the first wavelength region and the other of the second wavelength region. The signal branch of the first wavelength region passes through the coupler 2b, amplified in the Tm-doped fiber 31, and reaches the coupler 4. On the other hand, the signal branch of the second wavelength region directly reaches the coupler 4. The second pump light($\lambda$2) emitted from the second laser source 5b enters the Thulium-doped fiber 31 via the coupler 2b. The first and second signal branches are joined in the coupler 4 to be the output light of the amplifier.

In this embodiment, $\lambda$1 is controlled so that the peak in the gain spectrum of the Thulium(Tm)-doped fiber compensates the second bottom B2 in the gain spectrum of the tellurite Raman amplifier pumped with the light of wavelength $\lambda$1. A flat spectrum is obtained over a wide wavelength range by compensating the gain coefficient at the second bottom B2 in the gain spectrum provided by the pump light of wavelength $\lambda$1.

Available Tm-doped fibers include Tm-doped tellurite fibers, Tm-doped fluoride fibers and Tm-doped silica fibers. The wavelength $\lambda$2 of the second pump light for the Tm-doped fiber is 1400 nm. The gain wavelength region of the Tm-doped fiber is about 1460–1510 nm, while in the wavelength longer than 1510 nm there occurs a loss due to the ground state absorption. Although the Tm-doped fiber 31 takes the configuration for forward pumping in FIG. 17, it may take the configuration for backward pumping.

In order to avoid the fiber loss caused by the Tm-doped fiber, the signal light is split with the wavelength-selective splitter 16 into the first wavelength(about 1460–1510 nm) branch and the second wavelength(about 1515–1620 nm) branch. Then only the first wavelength signal branch is pumped in the Tm-doped fiber 31 and guided to the coupler 4. Meanwhile, the splitter 16 and the coupler 4 are connected with an optical fiber having a negligible loss in the propagation path of the second wavelength signal branch. In this case, the 1510–1515 nm region is the dead band for the splitter and the coupler.

The wavelength $\lambda$1 of the pump light for the tellurite fiber 1 is 1310–1480 nm, preferably 1450 nm, in order to match the gain region of the Tm-doped fiber with the second bottom.

EXAMPLE 13

In the Raman amplifier shown in FIG. 17, the wavelength of the first pump light emitted from LDM-1 was set at 1450 nm and its power at 200 mW. The wavelength of the second pump light emitted from LDM-2 was set at 1400 nm and its power at 200 mW. The tellurite fiber 1 and the Tm-doped fiber 31 were 200 m and 5 m long, respectively. The concentration of doped Thulium was 6000 ppm by weight.

The Raman amplifier of this example provided a flat gain spectrum (flat gain bandwidth of 160 nm) over the about 1460–1620 nm wavelength region excluding the 1510–1515 nm dead band.

The Thirteenth Embodiment

Figure 18:
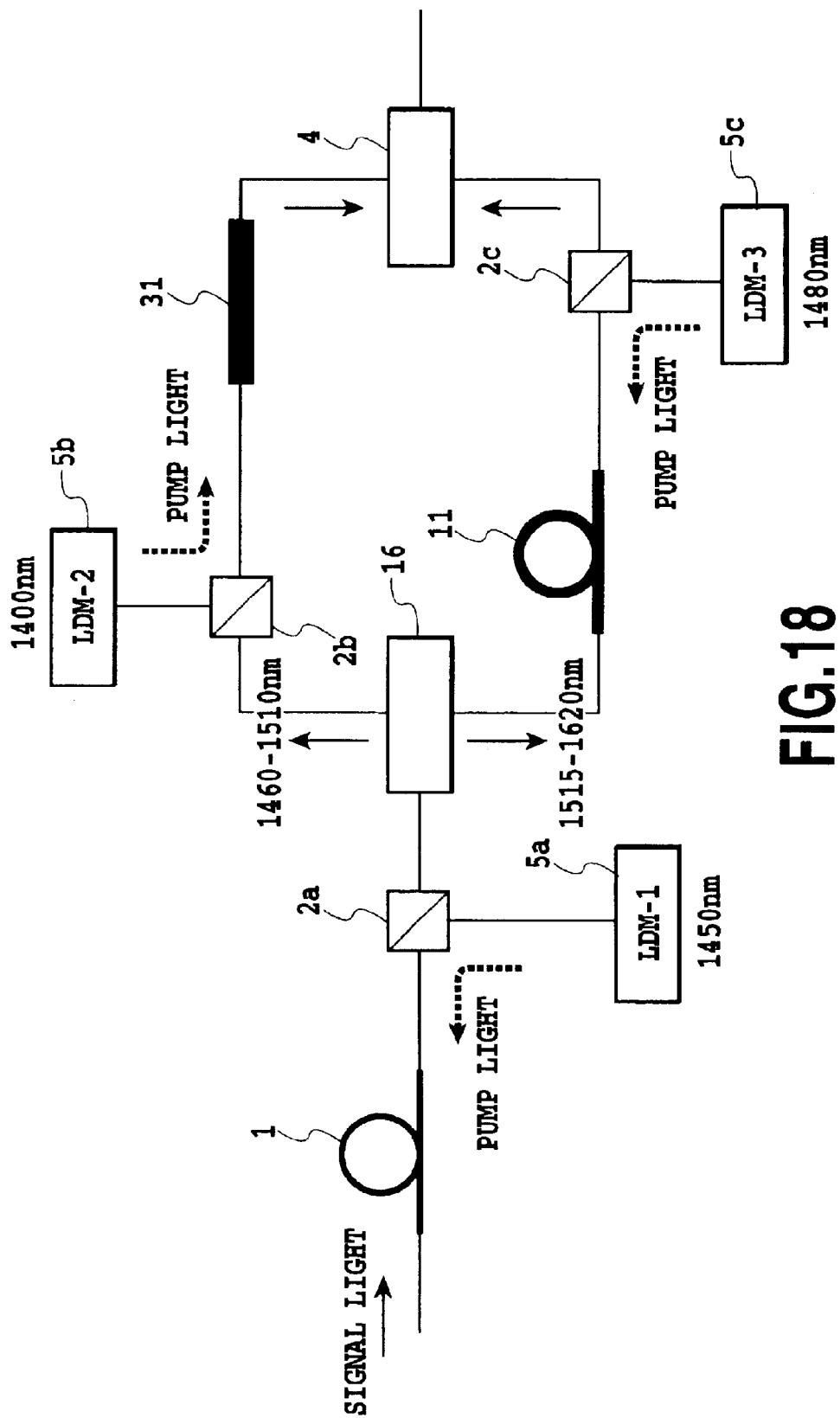
FIG. 18 is a diagram illustrating the structure of the Raman amplifier according to the thirteenth embodiment of the invention.

The thirteenth embodiment of the present invention is a tellurite Raman amplifier shown in FIG. 18 that has a tellurite fiber, a first laser source for pumping the tellurite fiber, a wavelength-selective splitter for dividing the signal light amplified in the tellurite fiber selectively according to wavelength, a Thulium(Tm)-doped fiber where one branch of the divided signal light enters, a second laser source for pumping the Tm-doped fiber, a silica fiber where the other branch of signal light divided with the splitter enters, a third laser source for pumping the silica fiber, and a coupler that combines the signal light branch amplified in the Tm-doped fiber and the other signal light branch amplified in the silica fiber.

Referring now to FIG. 18, a tellurite fiber 1, a coupler 2a and a wavelength-selective splitter 14 are connected in series. Signal light comes in the tellurite fiber 1 from the left side (namely, the tellurite fiber 1 is located in the upstream stage in the incident direction of signal light). The first pump light($\lambda$1) emitted from the first laser source 5a enters the tellurite fiber 1 via the coupler 2a. The signal light is split by the wavelength-selective splitter 14 into the signal branch of the first wavelength region and the other of the second wavelength region. The signal branch of the first wavelength region passes through the coupler 2b, amplified in the Tm-doped fiber 31, and reaches the coupler 4. On the other hand, the signal branch of the second wavelength region is amplified in the silica fiber 11, passes through the coupler 2c and reaches the coupler 4. The second pump light($\lambda$2) emitted from the second laser source 5b enters the Thulium-doped fiber 31 via the coupler 2b. The third pump light emitted from the third laser source 5c enters the silica fiber 11 via the coupler 2c. The first and second signal branches are joined in the coupler 4 to be the output light of the amplifier. In the present embodiment as well, the 1510–1515 nm wavelength region is the dead band for the splitter and the coupler.

In this embodiment, $\lambda$1 is controlled so that the peak in the gain spectrum of the Thulium(Tm)-doped fiber compensates the second bottom B2 in the gain spectrum of the tellurite Raman amplifier pumped with the first pump light of wavelength $\lambda$1. In the other words, the second bottom B2 in the gain spectrum provided by the first pump light of wavelength $\lambda$1 is flattened by the Tm-doped fiber 31. The wavelength $\lambda$1 of the pump light for the tellurite fiber 1 is 1310–1480 nm, preferably 1450 nm, in order to match the gain region of the Tm-doped fiber with the second bottom. Although the Tm-doped fiber 31 takes the configuration for forward pumping in FIG. 18, it may take the configuration for backward pumping.

Meanwhile, the wavelength $\lambda$3 of the third pump light from the third laser source is controlled so as to compensate the first bottom B1 in the gain spectrum of the tellurite Raman amplifier pumped with the light of wavelength $\lambda$1. The wavelength $\lambda$3 should be between 1380–1550 nm, preferably 1480 nm. Although the silica fiber 11 takes the configuration for backward pumping in FIG. 18, it may take the configuration for forward pumping.

As described above, the first bottom in the gain spectrum of the tellurite Raman amplifier pumped with the light of wavelength λ1 is compensated with the peak in the gain spectrum of the silica fiber, and its second bottom is compensated with the peak in the gain spectrum of the Tm-doped fiber. Then a flat spectrum is obtained over a wide wavelength range.

EXAMPLE 14

In the Raman amplifier shown in FIG. 18, the wavelength of the first pump light emitted from LDM-1 was set at 1450 nm and its power at 200 mW. The wavelength of the second pump light emitted from LDM-2 was set at 1400 nm and its power at 200 mW. The wavelength of the third pump light emitted from LDM-3 was set at 1480 nm and its power at 200 mW. The tellurite fiber 1 and the silica fiber 11 were 200 m and 5 km long, respectively. The Tm-doped fiber 31 was 5 m long. The concentration of doped Thulium was 6000 ppm by weight.

The Raman amplifier of this example provided a flat gain spectrum (flat gain bandwidth of 160 nm) over the about 1460–1620 nm wavelength range excluding the 1510–1515 nm dead band.

The Fourteenth Embodiment

Figure 19:
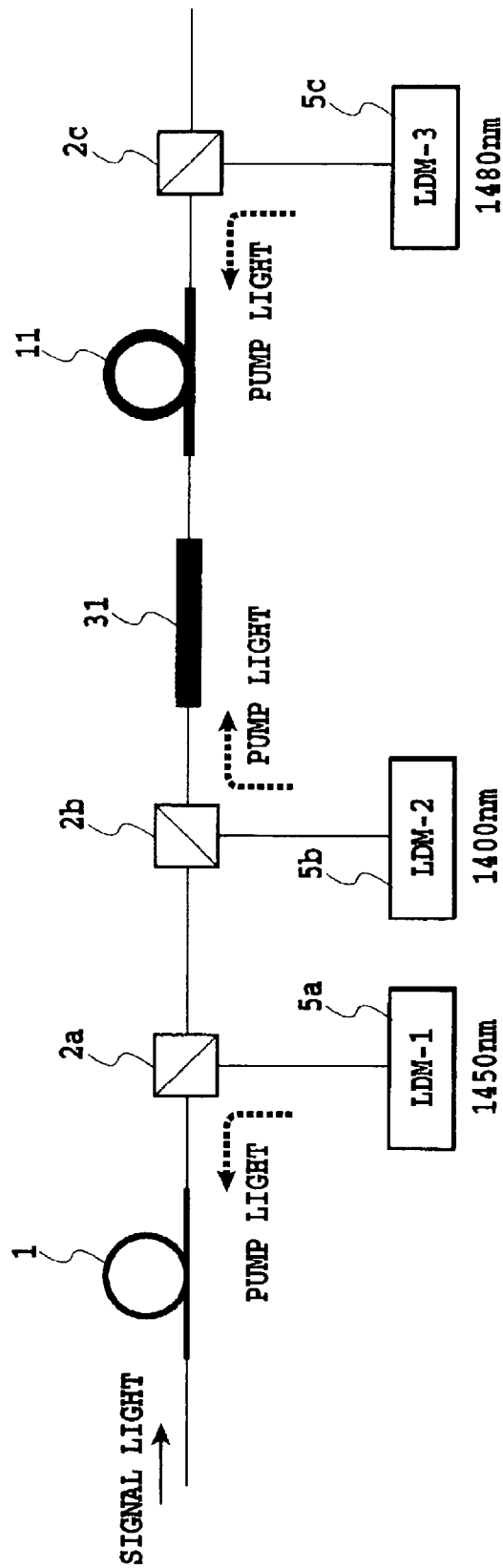
FIG. 19 is a diagram illustrating the structure of the Raman amplifier according to the fourteenth embodiment of the invention.

The fourteenth embodiment of the present invention is a tellurite Raman amplifier shown in FIG. 19 that has first, second and third laser sources, a tellurite fiber pumped with the light emitted from the first laser source, a rare-earth doped fiber (for example, Thulium(Tm)-doped fiber and Erbium-doped fiber) pumped with the light emitted from the second laser source, and a silica fiber pumped with the light emitted from the third laser source. In this configuration, the tellurite fiber, the rare-earth doped fiber and the silica fiber are connected in series.

Referring now to FIG. 19, a tellurite fiber 1, a coupler 2a, another coupler 2b, a Tm-doped fiber 31, a silica fiber 11 and another coupler 2c are connected in series. The signal light is introduced into the tellurite fiber 1 from the left side (namely, the tellurite fiber 1 is located in the upstream stage in the incident direction of signal light). The first pump light(λ1) emitted from the first laser source 5a enters the tellurite fiber 1 via the coupler 2a. The second pump light(λ2) emitted from the second laser source 5b enters the Tm-doped fiber 31 via the coupler 2b. The third pump light(λ3) emitted from the third laser source 5c the silica fiber 11 via the coupler 2c.

The wavelength λ2 of the second pump light emitted from the second laser source is determined according to the rare-earth element that is employed. The rare-earth elements that can be used in this embodiment include Thulium and Erbium, preferably Thulium. In the case of using Thulium, the wavelength for pumping should be 1400 nm and its resulting gain wavelength region will be 1460–1510 nm. The width of the gain bandwidth provided by such rare-earth doped fibers is about 50 nm. At wavelengths longer than the gain wavelength region, the ground state absorption(in case of Thulium) or upper state absorption(in case of Erbium) take place. Thus the wavelength λ1 of the pump light emitted from the first laser source is controlled so that the gain region of the rare-earth doped fiber overlaps the first or second bottom in the gain spectrum of the tellurite fiber pumped with the light of wavelength λ1. This settling makes it possible to prevent a rise in the noise figure of the whole amplifier system. Namely, signal light at wavelengths longer than the gain wavelength region provided by the rare-earth elements is amplified in advance with the tellurite fiber located in the input stage.

Further, the signal light coming out of the rare-earth doped fiber is amplified with the silica fiber located in the output stage. The wavelength λ3 of the third pump light for the silica fiber is controlled so as to compensate the first or second bottom in the gain spectrum provided by the pump light of wavelength λ1.

The settings according to the present embodiment make whichever possible to: compensate the first bottom in the spectrum of the tellurite fiber with the rare-earth doped fiber and compensate the second bottom with the silica fiber; or compensate the second bottom with the rare-earth doped fiber and compensate the first bottom with the silica fiber.

When using Thulium as the rare-earth element in this embodiment, the wavelength λ1 of the first pump light for the tellurite fiber can be set at 1310–1480 nm, preferably 1450 nm, and the wavelength λ3 of the third pump light for the silica fiber can be set at 1380–1550 nm, preferably 1480 nm.

The preferred configuration in the present embodiment is that the rare-earth doped fiber compensates the first bottom in the gain spectrum of the tellurite fiber and the silica fiber compensates the second bottom. Specifically, the settings become λ1=1450 nm and λ3=1480 nm.

One of the advantages of this configuration is the elimination of the dead band. Namely, in the thirteenth embodiment where the rare-earth doped fiber and the silica fiber are connected in parallel, there appears a hole in the gain spectrum because of the dead band of the wavelength-selective splitter used in this parallel connection. In contrast, according to the present embodiment, all the fibers are connected in series, eliminating the necessity of using a wavelength-selective splitter. Thus it becomes possible to prevent a hole in the gain spectrum (dead band of the whole system).

Another advantage of this embodiment is that the gain spectra of the Thulium-doped fiber and the silica fiber can be combined at a high efficiency. In the thirteenth embodiment, the efficiency in combining the gain spectra was low because the output beams provided by two fibers connected in parallel were combined in parallel. However, the serial combination provided by the serial connection of the fibers makes it possible to raise the efficiency in combining gain spectra.

EXAMPLE 15

In the Raman amplifier shown in FIG. 19, the wavelength of the first pump light emitted from LDM-1 was set at 1450 nm and its power at 200 mW. The wavelength of the second pump light emitted from LDM-2 was set at 1400 nm and its power at 200 mW. The wavelength of the third pump light emitted from LDM-3 was set at 1480 nm and its power at 200 mW. The tellurite fiber 1 and the silica fiber 11 were 200 m and 5 km long, respectively. The Tm-doped fiber 31 was 5 m long. The concentration of doped Thulium was 6000 ppm by weight.

The Raman amplifier of this example provided a flat gain spectrum (flat gain bandwidth of 160 nm) over the about 1460–1620 nm wavelength region with no dead band.

The Fifteenth Embodiment

Figure 20:
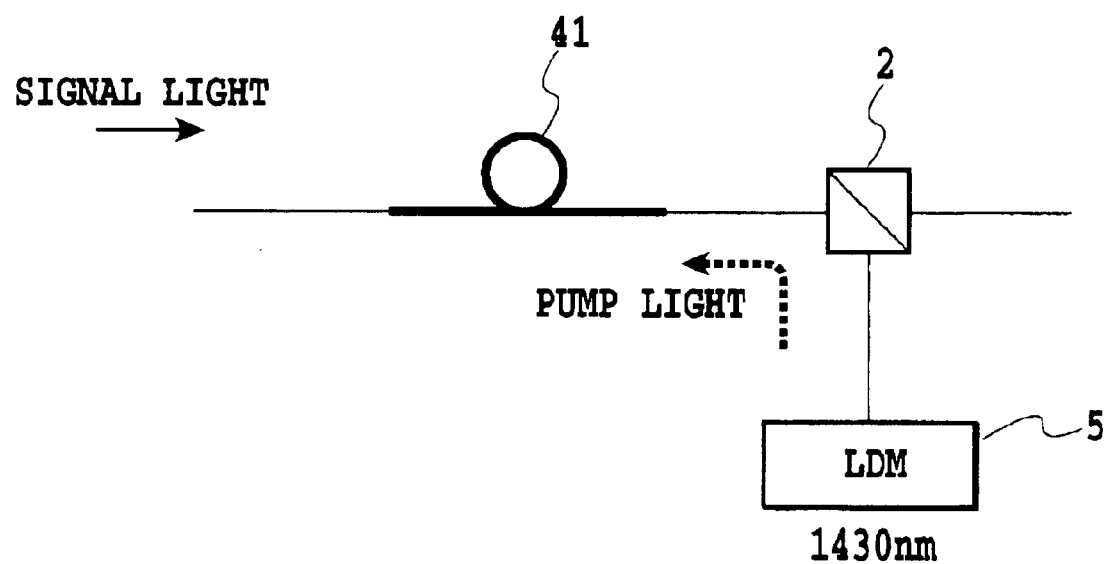
FIG. 20 is a diagram illustrating the structure of the Raman amplifier according to the fifteenth embodiment of the invention.

The Raman amplifier according to the fifteenth embodiment of the present invention is an optical fiber amplifier shown in FIG. 20 that has a laser source and a rare-earth doped fiber (for example, Thulium(Tm)-doped fiber and Erbium-doped fiber) pumped with the laser source.

Referring now to FIG. 20, the Erbium-doped tellurite fiber 41 and a coupler 2 are connected in series. The pump light($\lambda$) emitted from the laser source 5 enters the Erbium-doped tellurite fiber 41 via the coupler 2. The Erbium-doped tellurite fiber 41 simultaneously acts as a gain medium for stimulated Raman amplification by tellurite fiber and that for amplification by Erbium ion.

In this embodiment, the first bottom in the Raman gain spectrum of the tellurite fiber pumped with the light of wavelength $\lambda$ is compensated with the peak in the gain spectrum of the doped Er pumped with the light of wavelength $\lambda$. The wavelength $\lambda$ is 1410–1440 nm, preferably 1430 nm. Erbium ions can be pumped with the pump light of a wavelength of around 1430 nm and its gain spectrum, which is slightly different from that of the thirteenth embodiment though, has a peak at around 1530–1570 nm as well.

In this embodiment, the gain obtained by stimulative Raman amplification is proportional to the output power of pump light and the length of the tellurite fiber 41. On the other hand, the gain provided by Er is proportional to the product of the output power of pump light, the concentration of doped Er ions and the length of the fiber 41. Thus the Erbium concentration should be 1000 ppm by weight or less, preferably 250 ppm by weight or less, in order to control the power of pump light within a practical range for providing the desired Raman gain. For example, so as to equalize the gain provided by Er ions to the Raman gain of the tellurite fiber for yielding a flat gain spectrum, the fiber should be 50 m when a fiber doped 1000 ppm by weight of Er ions is employed, while it should be 250 m when a fiber doped 250 ppm by weight is employed. Namely, the Raman amplification efficiency in the latter case is about five times as high as the former.

EXAMPLE 16

Referring now to FIG. 19, the wavelength of the pump light emitted from LDM was set at 1430 nm and its power at 200 mW. The Erbium-doped tellurite fiber 41 was 250 m long and its Er concentration was 250 ppm by weight.

The Raman amplifier of this example provided a flat gain spectrum (flat gain bandwidth of 80 nm) over the about 1520–1600 nm wavelength range.

The Sixteenth Embodiment

Figure 21:
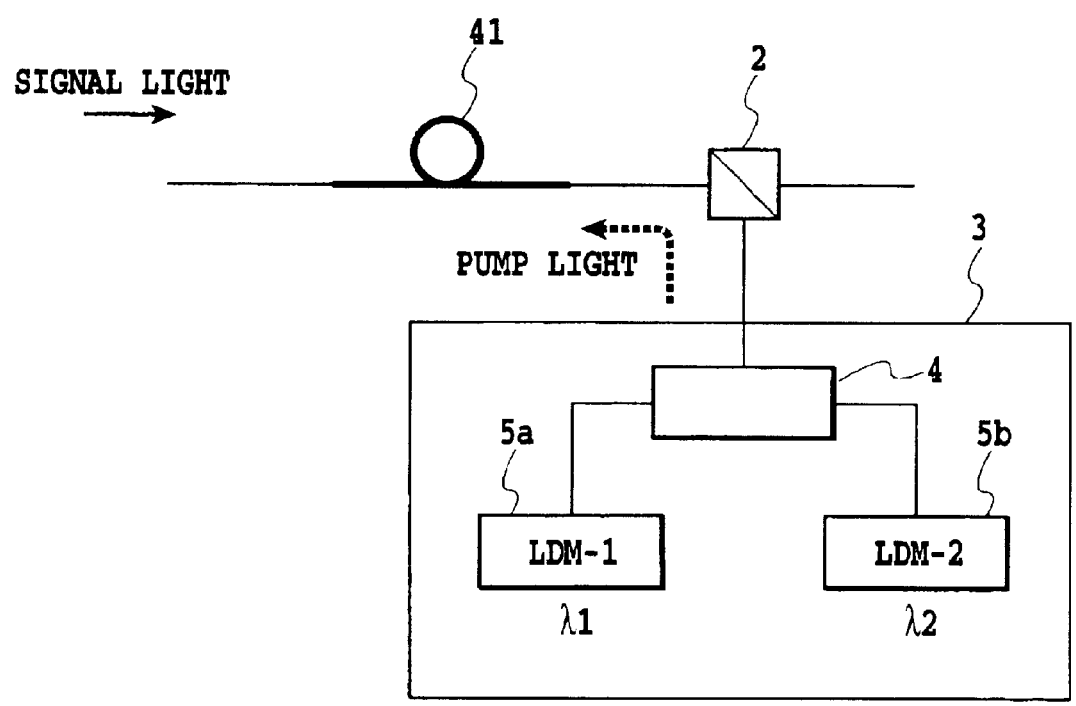
FIG. 21 is a diagram illustrating the structure of the Raman amplifier according to the sixteenth embodiment of the invention.

The Raman amplifier according to the sixteenth embodiment of the present invention is an optical fiber amplifier shown in FIG. 21 that has first and second laser sources and a rare-earth doped fiber (for example, Thulium(Tm)-doped fiber and Erbium-doped fiber) pumped with the first and second laser sources. The preferable rare-earth elements that can be used in this embodiment include Erbium and Thulium, preferably Erbium. Also, in this embodiment, The rare-earth doped fiber simultaneously acts as a gain medium for stimulated Raman amplification and that for amplification by rare-earth.

Referring now to FIG. 21, the Erbium-doped tellurite fiber 41 and a coupler 2 are serially connected. The pump light beams($\lambda 1$, $\lambda 2$) emitted from the first and second laser sources 5a, 5b are combined in the coupler 4 and enter the Erbium-doped tellurite fiber 41 via the coupler 2.

In this embodiment, the first bottom in the gain spectrum of the tellurite fiber pumped with the first pump light of wavelength $\lambda 1$ is compensated with the peak in the gain spectrum of the doped Er pumped with the light of wavelength $\lambda 2$. The wavelength $\lambda 1$ is 1410–1440 nm, preferably 1430 nm. The wavelength $\lambda 2$ is 1450–1500 nm, preferably 1480 nm.

In the present embodiment as well, the concentration of Erbium should be 1000 ppm by weight or less, preferably 250 ppm by weight or less, because of the reason described in the fifteenth embodiment.

The Seventeenth Embodiment

Figure 22:
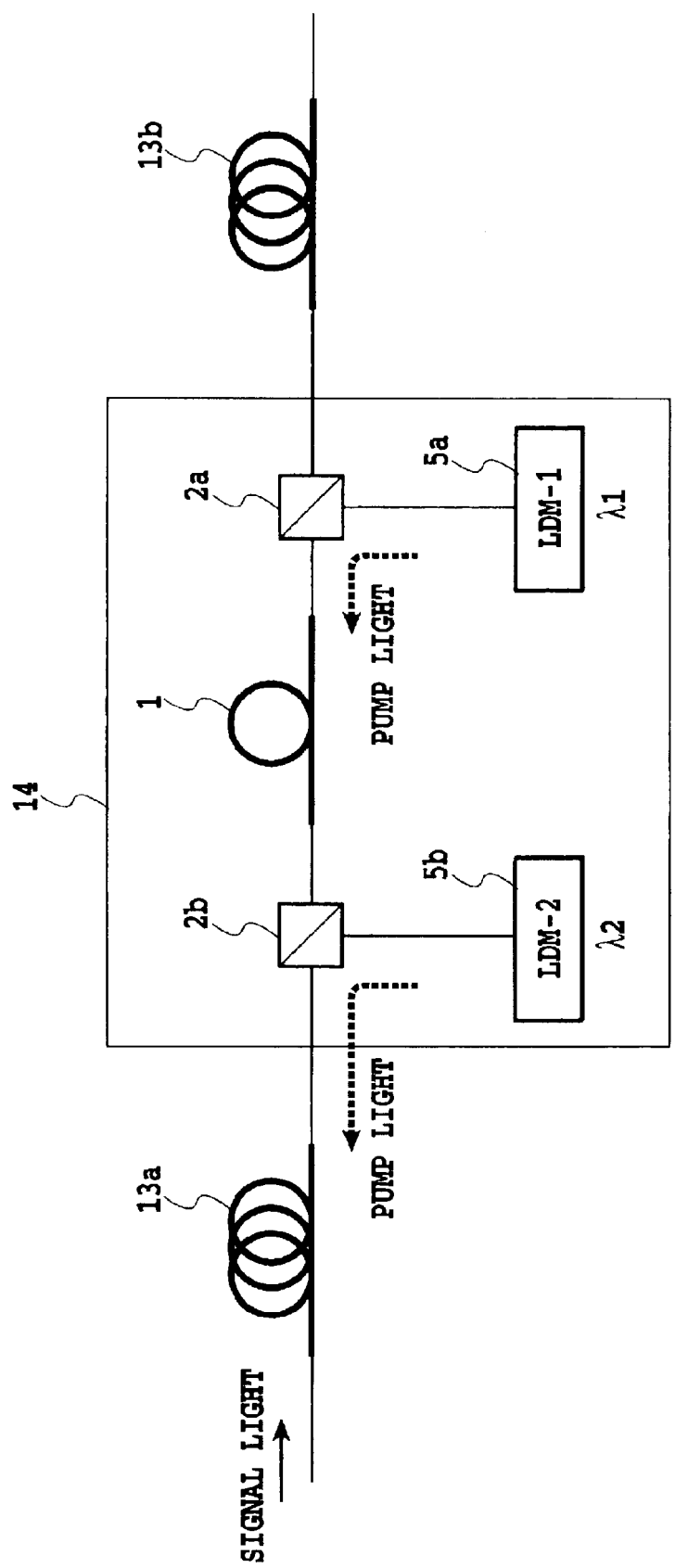
FIG. 22 is a diagram illustrating the structure of the optical communication system according to the seventeenth embodiment of the invention.

The seventeenth embodiment of the present invention is an optical communication system shown in FIG. 22 that has at least one transmission line span including (a) a repeater incorporating first and second laser sources and a tellurite fiber pumped with the light emitted from the first laser source, and (b) a transmission line consisting of a silica fiber pumped with the light emitted from the second laser source.

Referring now to FIG. 22, a silica fiber 13a serving as a transmission line, a coupler 2a, a tellurite fiber 1 and a coupler 2b are connected in serial, and this component set is further connected to another silica fiber 13b serving as a transmission line of the next span. The first pump light($\lambda 1$) emitted from the first laser source 5a enters the tellurite fiber 1 via the coupler 2a. The second pump light($\lambda 2$) emitted from the second laser source 5b enters the silica fiber 13a via the coupler 2b. The repeater 14 includes the first and second laser sources 5a, 5b, two couplers 2a, 2b and tellurite fiber 1. One repeater 14 and one transmission line(silica fiber 13a) form one span of the transmission line.

The first bottom in the gain coefficient spectrum of the tellurite fiber 1 provided by the first pump light ($\lambda 1$) emitted from the first laser source is controlled to overlap the peak in the gain coefficient spectrum of the silica fiber provided by the second pump light ($\lambda 2$) emitted from the second laser source. Specifically, the difference between $\lambda 1$ and $\lambda 2$ is set at $\lambda 2-\lambda 1=25\pm15$ nm, namely, 40 nm>$\lambda 2-\lambda 1$>10 nm. This different between $\lambda 1$ and $\lambda 2$, $\lambda 2-\lambda 1$, is more preferably 15 nm–35 nm, and most preferably 20–30 nm. The difference in wavenumber between the two pump light beams corresponding to such a difference in wavelength, 10 nm–40 nm, is about 42–166 cm$^{-1}$. When $\lambda 1$ and $\lambda 2$ are controlled as described above, the signal to noise ratio in the gain region of the silica fiber is improved (the noise figure is reduced) due to the distributed amplification in the transmission line. Since the bottom (valley) of the gain spectrum of the tellurite fiber 1 is compensated with the peak in the gain spectrum of the silica fiber, a flat gain spectrum is obtained over a wide wavelength region. Thus the degradation of the signal to noise ratio at around wavelengths near the bottom of the gain spectrum of the tellurite fiber 1 can be prevented easily and effectively. In addition, there is an advantage that if a particularly large signal to noise ratio is obtained in a wavelength region where the silica fiber presents a large distributed gain, this wavelength region can be set at the zero-dispersion wavelength for the transmission line.

The silica fibers 13a, 13b serving as transmission lines are such low-loss fibers as dispersion compensating fibers (DCF), dispersion shifted fibers(DSF) and 1.3 $\mu$m single mode fibers in typical cases. When the Raman amplification is conducted distributively in the transmission line, the signal to noise ratio rises(noise falls) due to the distributed amplification at wavelengths where the distributed gain becomes high. The 1.3 $\mu$m single mode fiber is a fiber having zero dispersion at 1.3 $\mu$m. The dispersion shifted fiber is a fiber of which wavelength presenting zero dispersion is shifted from 1.3 $\mu$m to around 1.55 $\mu$m through control of the waveguide dispersion. The dispersion shifted fiber is, therefore, particularly important in the long-haul transmission system for the trunk lines, and also suitable for use in high speed transmission systems employing signal light of a wavelength around 1.55 $\mu$m.

EXAMPLE 17

In the optical communication system shown in FIG. 22, the wavelength of the first pump light emitted from LDM-1 was set at 1450 nm and its power at 200 mW. The wavelength of the second pump light emitted from LDM-2 was set at 1475 nm and its power at 200 mW. The tellurite fiber 1 and the silica fiber 13a serving as a transmission line were 200 m and 40 km long, respectively.

The optical communication system of this example provided a flat gain spectrum (flat gain bandwidth of 80 nm) over the about 1550–1630 nm wavelength range.

EXAMPLE 18

In the optical communication system shown in FIG. 22, the wavelength of the first pump light emitted from LDM-1 was set at 1420 nm and its power at 200 mW. The wavelength of the second pump light emitted from LDM-2 was set at 1445 nm and its power at 200 mW. The tellurite fiber 1 was 200 m long. The silica fiber 13a serving as a transmission line was a DSF which was 80 km in length.

The optical communication system according to this example provided a flat gain spectrum (flat gain bandwidth of 80 nm) over the about 1510–1590 nm wavelength range. Besides, in this example, the zero dispersion wavelength was able to be set at 1550 nm. Since the signal to noise ratio became high at wavelengths near 1550 nm, the degradation of transmission quality due to non-linear effects was successfully prevented.

The Eighteenth Embodiment

Figure 23:
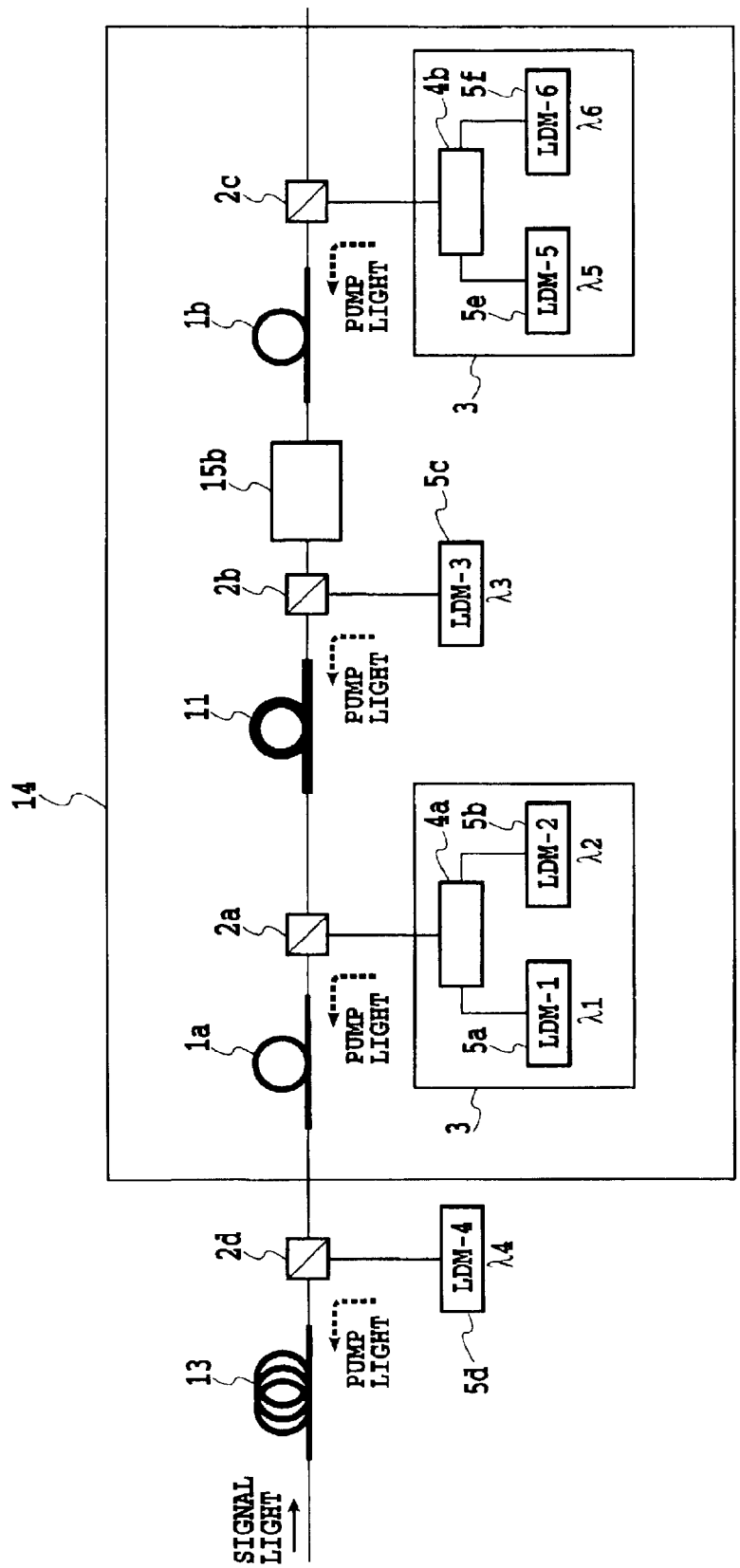
FIG. 23 is a diagram illustrating the structure of the optical communication system according to the eighteenth embodiment of the invention.

The eighteenth embodiment of the present invention is an optical communication system shown in FIG. 23 that has at least one transmission line span including (a) a repeater incorporating first to third and fifth to sixth laser sources, and a first tellurite fiber pumped with the pump light beams emitted from the first and second laser sources, a first silica fiber pumped with the pump light emitted from the third laser source, and a second tellurite fiber pumped with the pump light beams emitted from the fifth and sixth laser sources, and (b) a transmission line consisting of a fourth laser source and a second silica fiber pumped with the pump light emitted from the fourth laser source.

Referring now to FIG. 23, the Raman amplifier of the tenth embodiment shown in FIG. 15 is employed as the repeater 14. However, there is a difference that the silica fiber 11 is pumped with only the third pump light of a single wavelength $\lambda 3$. A silica fiber 13 serving as a transmission line, a coupler 2d, the first tellurite fiber 1a, another coupler 2a, a silica fiber 11, another coupler 2b, the second tellurite fiber 1b and another coupler 2c are connected in series. The pump light beams($\lambda 1$ and $\lambda 2$) emitted from the first and second laser sources 5a, 5b enter the first tellurite fiber 1a via the coupler 4a. The pump light($\lambda 3$) emitted from the third laser source 5c enters the silica fiber 11 via the coupler 2b. The pump light beams($\lambda 5$ and $\lambda 6$) emitted from the fifth and sixth laser sources 5e, 5f enter the second tellurite fiber 1b via the coupler 4b. The repeater 14 includes these components except for the silica fiber 13 and the coupler 2d. The pump light($\lambda 4$) emitted from the fourth laser source 5d enters the silica fiber 13 serving as a transmission line via the coupler 2d. One repeater 14 and one transmission line(silica fiber 13) form one span of the transmission line. Signal light is injected into the repeater via the silica fiber 13.

In the Raman amplifier according to Example 10, the first and second bottoms in the gain spectrum of the first tellurite fiber 1a are not completely flattened by the peak in the gain spectrum of the silica fiber 11, although a wideband tellurite fiber is employed in the input stage. As a result, at either the first or second bottom or at both the first and second bottoms, the noise figure becomes larger than those at the wavelengths corresponding to the first and second peaks. In the optical communication system according to the present embodiment, however, it becomes possible to effectively reduce the noise figure at the first and second bottoms by conducting distributed Raman amplification in the silica fiber 13 that serves as a transmission line.

A flat gain spectrum and low noise figure are obtained over a wide wavelength range by the silica fiber 13 serving as a transmission line, the first tellurite fiber 1a and silica fiber 11. Also in this embodiment, the output power of the repeater 14 (eventually the output of the optical communication system) can be raised by employing the second wideband tellurite fiber 1b in the output stage. In this case, it is preferable to install a gain equalizer 15 between the silica fiber 11 and the second tellurite fiber 1b for a flattened spectrum and augmented amplifier output. If the desired performance (flat gain over a wide band, high output power and low noise figure) is attained in a stage before the silica fiber 11, the second tellurite fiber 1b may be omitted.

The conditions that $\lambda 1$ to $\lambda 6$ must meet are the same as those for the tenth embodiment.

Namely, the difference between $\lambda 1$ and $\lambda 2$ is set at $\lambda 1-\lambda 2=50\pm 20$ nm, namely, 30 nm<$\lambda 1-\lambda 2$<70 nm. This difference corresponds to a difference of 125–290 cm$^{-1}$ in wavenumber between the first pump light and the second pump light in the wavelength band of interest in this embodiment. Besides, the difference between $\lambda 1$ and $\lambda 3$ is set at $\lambda 3-\lambda 1=25\pm 15$ nm, namely, 10 nm<$\lambda 3-\lambda 1$<40 nm. This difference corresponds to a difference of 42–166 cm$^{-1}$ in wavenumber between the first pump light and the third pump light. In addition, the difference between $\lambda 1$ and $\lambda 4$ is set at $\lambda 1-\lambda 4=40\pm 30$ nm, namely, 10 nm<$\lambda 1-\lambda 4$<70 nm. This difference corresponds to a difference of 42–290 cm$^{-1}$ in wavenumber between the first pump light and the fourth pump light. The settings for $\lambda 5$ and $\lambda 6$ are the same as those for $\lambda 1$ and $\lambda 2$.

According to the above settings, the gain peak in the spectrum of the silica fiber 11 pumped with the light of wavelength $\lambda 3$ compensates the first bottom in the spectrum of the tellurite fiber pumped with the light of wavelength $\lambda 1$. Meanwhile, the gain peak in the spectrum of the silica fiber 13 pumped with the light of wavelength $\lambda 4$ compensates the second bottom in the spectrum of the tellurite fiber pumped with the light of wavelength $\lambda 1$. It is allowed that the gain peak pumped with wavelength $\lambda 3$ may compensate the second bottom and the gain peak pumped with wavelength $\lambda 4$ may compensate the first bottom, exchanging the settings for the wavelengths $\lambda 3$ and $\lambda 4$. That is, the difference between $\lambda 1$ and $\lambda 4$ may be set at $\lambda 4-\lambda 1=25\pm 15$ nm, namely, 10 nm<$\lambda 4-\lambda 1$<40 nm, while the difference between $\lambda 1$ and $\lambda 3$ may be set at $\lambda 1-\lambda 3=40\pm 30$ nm, namely, 10 nm<$\lambda 1-\lambda 3$<70 nm. In other words, the difference in wavelength between the fourth and first pump light beams may be 42–166 cm$^{-1}$, and that between the first and third pump light beams may be 42–290 cm$^{-1}$.

Although the silica fiber 13 is pumped with the light of a single wavelength in the configuration shown in FIG. 23, it may be pumped with two pump light beams of different wavelengths. In such a case, however, those two wavelengths of pump light beams must meet the conditions set for above $\lambda 3$ and $\lambda 4$. If two pump light beams of different wavelengths are employed, both the first and second bottoms in the gain spectrum of the tellurite fiber can be compensated with the distributed gain in the spectrum of the silica fiber 13 and the noise figure can be further reduced. Two-wavelength pumping may also be applied to the silica fiber 11a installed in the repeater under the same conditions.

Further, in the configuration shown in FIG. 23, the laser sources 5e, 5f for pumping the second tellurite fiber are employed in addition to the laser sources 5a, 5b for pumping the first tellurite fiber. However, it is possible to divide the coupled pump light made of pump light beams from the laser sources 5a, 5b and then supply the divided pump light beams to both of the first and second tellurite fibers.

EXAMPLE 19

In the optical communication system shown in FIG. 23, the wavelength of the pump light emitted from LDM-1 and LDM-5 were set at 1450 nm and its power at 200 mW. The wavelength of the pump light emitted from LDM-2 and LDM-6 were set at 1410 nm and its power at 200 mW. The wavelength of the pump light emitted from LDM-3 was set at 1475 nm and its power at 200 mW. The wavelength of the pump light emitted from LDM-4 was set at 1400 nm and its power at 200 mW. The tellurite fiber 1a was 200 m long, and the tellurite fiber 1b was 180 m long. The silica fiber 11 was 5 km long. The silica fiber 13 serving as a transmission line was a DSF that was 80 km in length.

The optical communication system according to this example provided a flat gain spectrum (flat gain bandwidth of 130 nm) over the about 1500–1630 nm wavelength region. Moreover, the effective noise figure was lower than that attained in Example 11(FIG. 15). Indeed, although the maximum noise figure attained in Example 11 was 9 dB, it was 6 dB in the current example.

As explained so far, the inventors have made this invention focusing on that the gain spectrum provided by Raman amplification of signal light depends on pump light and pumping media.

That is, the optical fiber amplifier according to the present invention is a Raman fiber amplifier using the tellurite fiber as the principle component and provides such merits as the bandwidth widening of flat gain band, reduction of noise figure and increase of the amplifier output, by appropriately combining the techniques of: 1) pumping the tellurite fiber with two wavelengths, 2) pumping the tellurite fiber and the silica fiber with different wavelengths, 3) pumping the low-concentration Er-doped tellurite fiber with one or two wavelengths, and 4) pumping the tellurite fiber and the Tm-doped fiber with different wavelengths. Besides, this invention contributes to reduced cost of the amplifier because the above goals can be attained with a minimal number of pump light sources.

The optical communication system according to the present invention is a system employing a repeater using a tellurite fiber and a silica fiber transmission line providing the distributed amplification. This system presents such advantages as the bandwidth widening of flat gain band, reduction of noise figure and increase of the amplifier output by appropriately combining the above techniques, using a minimal number of pump light sources.

The present invention thus solves the problems that the gain band is limited and that many pump light sources are needed in optical communication systems using the prior art Raman amplifier and Raman amplification technique.

The present invention has been described in details with respect to various embodiments, and it will now be apparent from the foregoing to those skilled in the art that changes and modifications may be made without departing from the invention in its broader aspects, and it is the invention, therefore, in the appended claims to cover all such changes and modifications as fall within the true spirit of the invention.

What is claimed is:

1. An optical fiber amplifier comprising:
   two laser sources emitting pump light beams of wavelengths different from each other; and
   a tellurite fiber pumped with the pump light emitted from said two laser sources;
   wherein the absolute difference in wavenumber between said pump light beams emitted from the two laser sources is 125–290 $cm^{-1}$.

2. The optical fiber amplifier as claimed in claim 1, further comprising a coupler that combines the pump light beams emitted from said two laser sources.

3. An optical fiber amplifier comprising:
   three or more laser sources emitting pump light beams of wavelengths different from one another; and
   a tellurite fiber pumped with the pump light emitted from said three or more laser sources;
   wherein said three or more laser sources are divided into two groups not overlapping each other in wavelength and the absolute difference in wavenumber between the corresponding weight center wavelengths of said two groups is 125–290 $cm^{-1}$.

4. The optical fiber amplifier as claimed in claim 3, further comprising a coupler that combines the pump light beams emitted from said three or more laser sources.

5. The optical fiber amplifier as claimed in claim 1, wherein said tellurite fiber is a dispersion compensating fiber.

6. The optical fiber amplifier as claimed in claim 1, further comprising a gain equalizer installed in the downstream stage of said tellurite fiber in incident direction of signal light.

7. An optical fiber amplifier comprising:
   two laser sources emitting pump light beams of wavelengths different from each other; and
   a first tellurite fiber and a second tellurite fiber pumped with the pump light emitted from said two laser sources;
   wherein the absolute difference in wavenumber between said pump light beams emitted from the two laser sources is 125–290 $cm^{-1}$.

8. The optical fiber amplifier as claimed in claim 7, wherein said first tellurite fiber and second tellurite fiber are connected in series.

9. The optical fiber amplifier as claimed in claim 8, further comprising a gain equalizer installed between said first tellurite fiber and second tellurite fiber.

10. The optical fiber amplifier as claimed in claim 7, further comprising:
    a coupler that combines the pump light beams emitted from said two laser sources; and
    a splitter that splits an output light from said coupler into input light branches to be provided for said first tellurite fiber and second tellurite fiber.

11. An optical fiber amplifier comprising:
    three or more laser sources emitting pump light beams of wavelengths different from one another; and
    two tellurite fibers pumped with the pump light emitted from said three or more laser sources;
    wherein said three or more laser sources are divided into two groups not overlapping each other in wavelength and the absolute difference in wavenumber between the corresponding weight center wavelengths of said two groups is 125–290 $cm^{-1}$.

12. The optical fiber amplifier as claimed in claim 7, wherein at least one of said first tellurite fiber and said second tellurite fiber is a dispersion compensating fiber.

13. An optical Raman fiber amplifier comprising:
   first and second laser sources emitting pump light beams of wavelengths different from each other;
   a tellurite fiber pumped with the pump light emitted from said first laser source; and
   a silica fiber pumped with the pump light emitted from said second laser source.

14. The optical fiber amplifier as claimed in claim 13, wherein the difference in wavenumber between the pump light emitted from said second laser source and that emitted from said first laser source is 42–166 cm$^{-1}$.

15. The optical fiber amplifier as claimed in claim 13, wherein said tellurite fiber and said silica fiber are connected in series.

16. The optical fiber amplifier as claimed in claim 15, wherein said tellurite fiber is installed upstream in incident direction of signal light.

17. The optical fiber amplifier as claimed in claim 15, further comprising:
   a first coupler for injecting the pump light emitted from said first laser source into said tellurite fiber; and
   a second coupler for injecting the pump light emitted from said second laser source into said silica fiber.

18. The optical fiber amplifier as claimed in claim 13, wherein said tellurite fiber is a dispersion compensating fiber.

19. The optical fiber amplifier as claimed in claim 13, wherein said silica fiber is a dispersion compensating fiber.

20. The optical fiber amplifier as claimed in claim 13, further comprising a coupler that combines the pump light emitted from said first laser source and that from said second laser source.

21. The optical fiber amplifier as claimed in claim 20, wherein said tellurite fiber and said silica fiber are connected in series.

22. The optical fiber amplifier as claimed in claim 21, wherein said tellurite fiber is installed upstream in the incident direction of signal light.

23. The optical fiber amplifier as claimed in claim 20, wherein said tellurite fiber is a dispersion compensating fiber.

24. The optical fiber amplifier as claimed in claim 20, wherein said silica fiber is a dispersion compensating fiber.

25. The optical fiber amplifier as claimed in claim 22, further comprising a reflector installed between said tellurite fiber and said silica fiber to reflect the pump light emitted from said second laser source.

26. The optical fiber amplifier as claimed in claim 20; wherein said tellurite fiber and said silica fiber are connected in series, said silica fiber is installed upstream in the incident direction of signal light, and further comprising a reflector installed between said tellurite fiber and silica fiber to reflect the pump light emitted from said first laser source.

27. The optical fiber amplifier as claimed in claim 25, wherein said tellurite fiber is a dispersion compensating fiber.

28. The optical fiber amplifier as claimed in claim 25, wherein said silica fiber is a dispersion compensating fiber.

29. The optical fiber amplifier as claimed in claim 26, wherein said tellurite fiber is a dispersion compensating fiber.

30. The optical fiber amplifier as claimed in claim 26, wherein said silica fiber is a dispersion compensating fiber.

31. An optical amplifier comprising:
   a plurality of tellurite fibers;
   a plurality of silica fibers; and
   two laser sources emitting pump light beams of wavelengths different from each other;
   wherein said tellurite fibers and said silica fibers are connected in series adjacent to each other.

32. The optical fiber amplifier as claimed in claim 31, wherein the difference in wavenumber between the two pump light beams emitted from said two laser sources is 42–166 cm$^{-1}$.

33. The optical fiber amplifier as claimed in claim 31, further comprising a coupler that combines the pump light beams emitted from said two laser sources and signal light.

34. The optical fiber amplifier as claimed in claim 31, wherein said tellurite fiber is installed in a most upstream stage of the incident direction of signal light.

35. The optical fiber amplifier as claimed in claim 31, wherein the number of said tellurite fibers is two and that of said silica fibers is two.

36. The optical fiber amplifier as claimed in claim 31, wherein said plurality of tellurite fibers are dispersion compensating fibers.

37. The optical fiber amplifier as claimed in claim 31, wherein said plurality of silica fibers are dispersion compensating fibers.

38. An optical fiber amplifier comprising:
   first, second and third laser sources emitting pump light beams of wavelengths different from one another;
   a tellurite fiber pumped with said first laser source; and
   a silica fiber pumped with said second and third laser sources.

39. The optical fiber amplifier as claimed in claim 38; wherein the difference in wavenumber between the pump light emitted from said second laser source and that emitted from said first laser source is 42–166 cm$^{-1}$, and the difference in wavenumber between the pump light emitted from said first laser source and that emitted from said third laser source is 42–294 cm$^{-1}$.

40. The optical fiber amplifier as claimed in claim 38, wherein said tellurite fiber and said silica fiber are connected in series.

41. The optical fiber amplifier as claimed in claim 40, wherein said tellurite fiber is installed upstream in incident direction of signal light.

42. The optical fiber amplifier as claimed in claim 38, further comprising a coupler that combines pump light emitted from said second laser source and pump light from said third laser source.

43. The optical fiber amplifier as claimed in claim 38, wherein said tellurite fiber is a dispersion compensating fiber.

44. The optical fiber amplifier as claimed in claim 38, wherein said silica fiber is a dispersion compensating fiber.

45. An optical fiber amplifier comprising:
   first, second and third laser sources emitting pump light beams of wavelengths different from one another;
   a tellurite fiber pumped with said first and second laser sources; and
   a silica fiber pumped with said third laser source.

46. The optical fiber amplifier as claimed in claim 45; wherein the difference in wavenumber between the pump light emitted from said third laser source and that emitted from said first laser source is 42–166 cm$^{-1}$, and the difference in wavenumber between the pump light emitted from said first laser source and that emitted from said second laser source is 125–290 cm$^{-1}$.

47. The optical fiber amplifier as claimed in claim 45, wherein said tellurite fiber and said silica fiber are connected in series.

48. The optical fiber amplifier as claimed in claim 47, wherein said tellurite fiber is installed upstream in the incident direction of signal light.

49. The optical fiber amplifier as claimed in claim 45, further comprising a coupler that combines pump light emitted from said first laser source and pump light emitted from said second laser source.

50. The optical fiber amplifier as claimed in claim 45, wherein said tellurite fiber is a dispersion compensating fiber.

51. The optical fiber amplifier as claimed in claim 45, wherein said silica fiber is a dispersion compensating fiber.

52. The optical fiber amplifier as claimed in claim 45, wherein, $\lambda 1$ and $\lambda 2$ being wavelengths ($\lambda 1 > \lambda 2$) at the gain peaks provided by pumping with only the pump light emitted from said first laser source, the ratio between an on-off Raman gain (in dB values) at $\lambda 1$ of said tellurite fiber and that at $\lambda 2$ lies between 100:80 and 100:100 when the tellurite fiber is pumped with the pump light beams emitted from said first and second laser sources.

53. An optical fiber amplifier comprising:
first, second, third and fourth laser sources emitting pump light beams of wavelengths different from one another;
a tellurite fiber pumped with said first and second laser sources; and
a silica fiber pumped with said third and fourth laser sources.

54. The optical fiber amplifier as claimed in claim 53;
wherein the difference in wavenumber between the pump light emitted from said third laser source and that emitted from said first laser source is 42–166 cm$^{-1}$,
the difference in wavenumber between the pump light emitted from said first laser source and that emitted from said second laser source is 125–290 cm$^{-1}$, and
the difference in wavenumber between the pump light emitted from said first laser source and that emitted from said fourth laser source is 42–290 cm$^{-1}$.

55. The optical fiber amplifier as claimed in claim 53, wherein said tellurite fiber and said silica fiber are connected in series.

56. The optical fiber amplifier as claimed in claim 55, wherein said tellurite fiber is installed upstream in the incident direction of signal light.

57. The optical fiber amplifier as claimed in claim 53, further comprising a coupler that combines the pump light emitted from said first laser source and that from said second laser source.

58. The optical fiber amplifier as claimed in claim 53, further comprising a coupler that combines the pump light emitted from said third laser source and that from said fourth laser source.

59. The optical fiber amplifier as claimed in claim 53, wherein said tellurite fiber is a dispersion compensating fiber.

60. The optical fiber amplifier as claimed in claim 53, wherein said silica fiber is a dispersion compensating fiber.

61. The optical fiber amplifier as claimed in claim 53, wherein, $\lambda 1$ and $\lambda 2$ being wavelengths ($\lambda 1 > \lambda 2$) at the gain peaks provided by pumping with only the pump light emitted from said first laser source, the ratio between an on-off Raman gain (in dB values) at $\lambda 1$ of said tellurite fiber and that at $\lambda 2$ lies between 100:80 and 100:100 when the tellurite fiber is pumped with the pump light beams emitted from said first and second laser sources.

62. An optical fiber amplifier comprising:
first, second, third and fourth laser sources emitting pump light beams of wavelengths different from one another;
fifth and sixth laser sources;
a first tellurite fiber pumped with said first and second laser sources;
a second tellurite fiber pumped with said fifth and sixth laser sources; and
a silica fiber pumped with said third and fourth laser sources.

63. The optical fiber amplifier as claimed in claim 62;
wherein the difference in wavenumber between the pump light emitted from said third laser source and that emitted from said first laser source is 42–166 cm$^{-1}$, the difference in wavenumber between the pump light emitted from said first laser source and that emitted from said second laser source is 125–290 cm$^{-1}$, and the difference in wavenumber between the pump light emitted from said first laser source and that emitted from said fourth laser source is 42–290 cm$^{-1}$.

64. The optical fiber amplifier as claimed in claim 63, wherein the pump light beams emitted from said fifth and first laser sources have the same wavelength and the pump light beams emitted from said sixth and second laser sources have the same wavelength.

65. The optical fiber amplifier as claimed in claim 62, wherein said first tellurite fiber, said silica fiber and said second tellurite fiber are connected in series in this order.

66. The optical fiber amplifier as claimed in claim 62, further comprising a coupler that combines pump light emitted from said first laser source and pump light emitted from said second laser source.

67. The optical fiber amplifier as claimed in claim 62, further comprising a coupler that combines pump light emitted from said third laser source and pump light emitted from said fourth laser source.

68. The optical fiber amplifier as claimed in claim 62, further comprising a coupler that combines pump light emitted from said fifth laser source and pump light emitted from said sixth laser source.

69. The optical fiber amplifier as claimed in claim 62, wherein at least one of said first tellurite fiber and second tellurite fiber is a dispersion compensating fiber.

70. The optical fiber amplifier as claimed in claim 62, wherein said silica fiber is a dispersion compensating fiber.

71. An optical Raman fiber amplifier comprising:
first and second laser sources emitting pump light beams of wavelengths different from each other;
a tellurite fiber; and
an Erbium-doped fiber.

72. The optical fiber amplifier as claimed in claim 71, wherein the wavelength of the pump light emitted from said first laser source is 1410–1440 nm and the wavelength of the pump light emitted from said second laser source is 1450–1500 nm.

73. The optical fiber amplifier as claimed in claim 71, wherein said tellurite fiber and said Erbium-doped fiber are connected in series.

74. The optical fiber amplifier as claimed in claim 73, wherein said tellurite fiber is installed upstream in incident direction of signal light.

75. The optical fiber amplifier as claimed in claim 71, wherein said tellurite fiber is a dispersion compensating fiber.

76. An optical fiber amplifier comprising:
first and second laser sources;
a tellurite fiber pumped with a pump light emitted from said first laser source;
a wavelength-selective splitter to split a signal light amplified in said tellurite fiber into a signal light output of a first wavelength region and a signal light output of a second wavelength region;

a Thulium-doped fiber that is pumped with a pump light emitted from said second laser source to amplify the signal light output of the first wavelength region; and a coupler to combine the signal light output of the first wavelength region amplified in said Thulium-doped fiber and the signal light output of the second wavelength region.

77. The optical fiber amplifier as claimed in claim 76, wherein the wavelength of the pump light emitted from said first laser source is 1310–1480 nm.

78. The optical fiber amplifier as claimed in claim 76, wherein said tellurite fiber is a dispersion compensating fiber.

79. The optical fiber amplifier as claimed in claim 76, further comprising a third laser source and a silica fiber pumped with a pump light emitted from said third laser source, wherein the signal light output of said second wavelength region is amplified in said silica fiber.

80. The optical fiber amplifier as claimed in claim 79, wherein the wavelength of the pump light emitted from said third laser source is 1380–1550 nm.

81. The optical fiber amplifier as claimed in claim 79, wherein said tellurite fiber is a dispersion compensating fiber.

82. The optical fiber amplifier as claimed in claim 79, wherein said silica fiber is a dispersion compensating fiber.

83. An optical fiber amplifier comprising:
first laser source, second laser source and third laser source;
a tellurite fiber pumped with a pump light emitted from said first laser source;
a Thulium-doped fiber pumped with a pump light emitted from said second laser source;
a silica fiber pumped with a pump light emitted from said third laser source;
wherein said tellurite fiber, Thulium-doped fiber and silica fiber are connected in series in this order.

84. The optical fiber amplifier as claimed in claim 83, wherein the wavelength of the pump light emitted from said first laser source is 1310–1480 nm and the wavelength of the pump light emitted from said third laser source is 1380–1550 nm.

85. The optical fiber amplifier as claimed in claim 83, wherein said Thulium-doped fiber is a Thulium-doped fluoride fiber.

86. The optical fiber amplifier as claimed in claim 83, wherein said tellurite fiber is a dispersion compensating fiber.

87. The optical fiber amplifier as claimed in claim 83, wherein said silica fiber is a dispersion compensating fiber.

88. An optical Raman fiber amplifier comprising:
a first laser source; and
an Erbium-doped tellurite fiber pumped with a pump light emitted from said first laser source;
wherein the wavelength of the pump light emitted from said first laser source is 1410–1440 nm.

89. The optical fiber amplifier as claimed in claim 88, wherein the concentration of Erbium doped in said Erbium-doped tellurite fiber is 1000 ppm by weight or less.

90. The optical fiber amplifier as claimed in claim 88, further comprising a second laser source for pumping said Erbium-doped tellurite fiber, wherein the wavelength of a pump light emitted from said second laser source is 1450–1500 nm.

91. The optical fiber amplifier as claimed in claim 90, wherein the concentration of Erbium doped in said Erbium-doped tellurite fiber is 1000 ppm by weight, or less.

92. The optical fiber amplifier as claimed in claim 90, further comprising a coupler that combines the pump light emitted from said first laser source and that from said second laser source.

93. An optical communication system including at least one transmission line segment with Raman amplification comprising:
(a) a repeater incorporating a first laser source and a second laser source and a tellurite fiber pumped with a pump light emitted from said first laser source; and
(b) a unit transmission line having a silica fiber pumped with a pump light emitted from said second laser source.

94. The optical communication system as claimed in claim 93, wherein the difference in wavenumber between the pump light emitted from said second laser source and the pump light emitted from said first laser source is 42–166 $cm^{-1}$.

95. The optical communication system as claimed in claim 93, wherein said tellurite fiber is a dispersion compensating fiber.

96. An optical communication system including at least one transmission line segment comprising:
(a) a repeater incorporating a first, a second and a third laser sources, and a fifth and a sixth laser sources, a first tellurite fiber pumped with the pump light emitted from said first and second laser sources, a first silica fiber pumped with pump light emitted from said third laser source, and a second tellurite fiber pumped with pump light emitted from said fifth and sixth laser sources; and
(b) a unit transmission line having a fourth laser source and a second silica fiber pumped with pump light emitted from said fourth laser source;
wherein said first, second, third and fourth laser sources emit pump light beams of wavelengths different from one another.

97. The optical communication system as claimed in claim 96, wherein
the difference in wave number between the pump light emitted from said third laser source and that emitted from said first laser source is 42–166 $cm^{-1}$,
the difference in wave number between the pump light emitted from said first laser source and that emitted from said second laser source is 125–290 $cm^{-1}$, and
the difference in wave number between the pump light emitted from said first laser source and that emitted from said fourth laser source is 42–290 $cm^{-1}$.

98. The optical communication system as claimed in claim 96, wherein
the difference in wave number between the pump light emitted from said fourth laser source and that emitted from said first laser source is 42–166 $cm^{-1}$,
the difference in wave number between the pump light emitted from said first laser source and that emitted from said second laser source is 125–290 $cm^{-1}$, and
the difference in wave number between the pump light emitted from said first laser source and that emitted from said third laser source is 42–290 $cm^{-1}$.

99. The optical communication system as claimed in claim 97, wherein the pump light beams emitted from said first and fifth laser sources have the same wavelength and the pump light beams emitted from said second and sixth laser sources have the same wavelength.

100. The optical communication system as claimed in claim 98, wherein the pump light beams emitted from said first and fifth laser sources have the same wavelength and the pump light beams emitted from said second and sixth laser sources have the same wavelength.

101. The optical communication system as claimed in claim 96, further comprising a seventh laser source for pumping said second silica fiber, wherein pump light beams emitted from said seventh and third laser sources have the same wavelength.

102. The optical communication system as claimed in claim 96, wherein said first tellurite fiber, first silica fiber and second tellurite fiber are connected in series in this order in said repeater.

103. An optical communication system including at least one transmission line segment comprising:
  (a) a repeater incorporating first, second and third laser sources, a first tellurite fiber pumped with pump light emitted from said first and second laser sources, and a first silica fiber pumped with pump light emitted from said third laser source; and
  (b) a unit transmission line having a fourth laser source and a second silica fiber pumped with pump light emitted from said fourth laser source;
  wherein said first, second, third and fourth laser sources emit pump light beams of wavelengths different from one another.

104. The optical communication system as claimed in claim 103, wherein the difference in wave number between the pump light emitted from said third laser source and that emitted from said first laser source is 42–166 cm$^{-1}$,
  the difference in wave number between the pump light emitted from said first laser source and that emitted from said second laser source is 125–290 cm$^{-1}$, and
  the difference in wave number between the pump light emitted from said first laser source and that emitted from said fourth laser source is 42–290 cm$^{-1}$.

105. The optical communication system as claimed in claim 103,
  wherein the difference in wave number between the pump light emitted from said fourth laser source and that emitted from said first laser source is 42–166 cm$^{-1}$,
  the difference in wave number between the pump light emitted from said first laser source and that emitted from said second laser source is 125–290 cm$^{-1}$, and
  the difference in wave number between the pump light emitted from said first laser source and that emitted from said third laser source is 42–290 cm$^{-1}$.

106. The optical communication system as claimed in claim 103, further comprising a fifth laser source for pumping said second silica fiber, wherein the pump light beams emitted from said fifth and third laser sources have the same wavelength.

107. The optical communication system as claimed in claim 103, wherein said repeater further comprises a second tellurite fiber, and said first tellurite fiber, first silica fiber and second tellurite fiber are connected in series in this order in said repeater.

* * * * *